(12) United States Patent
Ishihara et al.

(10) Patent No.: US 12,503,827 B2
(45) Date of Patent: Dec. 23, 2025

(54) LOADING WORK SUPPORT SYSTEM HAVING A FIRST POSITION CALCULATOR, A POSTURE DETECTOR AND A SECOND POSITION CALCULATOR

(71) Applicant: HITACHI, LTD., Tokyo (JP)

(72) Inventors: Shinji Ishihara, Tokyo (JP); Ryu Narikawa, Tokyo (JP); Akira Kanazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 193 days.

(21) Appl. No.: 18/026,894

(22) PCT Filed: Oct. 7, 2021

(86) PCT No.: PCT/JP2021/037190
§ 371 (c)(1),
(2) Date: Mar. 17, 2023

(87) PCT Pub. No.: WO2022/102298
PCT Pub. Date: May 19, 2022

(65) Prior Publication Data
US 2023/0332374 A1    Oct. 19, 2023

(30) Foreign Application Priority Data

Nov. 13, 2020    (JP) ................. 2020-189404

(51) Int. Cl.
*E02F 3/43* (2006.01)
*E02F 9/20* (2006.01)
*E02F 9/26* (2006.01)

(52) U.S. Cl.
CPC .............. *E02F 3/434* (2013.01); *E02F 3/437* (2013.01); *E02F 3/439* (2013.01); *E02F 9/2033* (2013.01); *E02F 9/262* (2013.01)

(58) Field of Classification Search
CPC ................................. E02F 3/437; E02F 3/434
See application file for complete search history.

(56) References Cited

U.S. PATENT DOCUMENTS

| 6,449,382 B1 * | 9/2002 | Ciccolo .................. G06V 10/24 |
| | | 382/103 |
| 2004/0158355 A1 * | 8/2004 | Holmqvist ........... G05D 1/0236 |
| | | 701/23 |

(Continued)

FOREIGN PATENT DOCUMENTS

| CN | 111137325 A | 5/2020 |
| CN | 111919003 A | 11/2020 |

(Continued)

OTHER PUBLICATIONS

International Search Report of PCT/JP2021/037190 dated Nov. 16, 2021.

(Continued)

*Primary Examiner* — Jess Whittington
(74) *Attorney, Agent, or Firm* — MATTINGLY & MALUR, PC

(57) ABSTRACT

Upon determining that the work apparatus will not enter a prohibited area set on the basis of output of a second position calculator of a carrier, the system computes, on the basis of the result of a prediction computation, first input of the dynamic characteristic with which a distal end of the work apparatus approaches a target position set on the basis of the output of the second position calculator. Upon determining that the work apparatus will enter the prohibited area, the system computes second input of the dynamic characteristic with which the distal end targets and approaches a position that is closer to the target position than the position of the distal end of the work apparatus at a position different from the target position outside the prohibited area, and the (Continued)

system computes control input for controlling the operation of the loader.

10 Claims, 16 Drawing Sheets

(56) References Cited

U.S. PATENT DOCUMENTS

| | | | |
|---|---|---|---|
| 2010/0223008 A1* | 9/2010 | Dunbabin | G05D 1/0274 |
| | | | 701/301 |
| 2012/0279285 A1* | 11/2012 | Kato | B30B 15/285 |
| | | | 73/65.01 |
| 2014/0261152 A1 | 9/2014 | Tanaka et al. | |
| 2018/0066415 A1* | 3/2018 | Friend | E02F 9/262 |
| 2018/0174462 A1* | 6/2018 | Um | B60W 40/12 |
| 2019/0055716 A1* | 2/2019 | Ishihara | E02F 9/2037 |
| 2019/0187703 A1* | 6/2019 | Millard | G05D 1/249 |
| 2021/0002852 A1* | 1/2021 | Nishi | E02F 9/2282 |
| 2021/0101791 A1* | 4/2021 | Ishizaki | G06V 40/10 |
| 2022/0106773 A1 | 4/2022 | Iwasaki | |
| 2022/0229498 A1* | 7/2022 | Demichel | B60R 25/2045 |
| 2024/0026645 A1* | 1/2024 | Olsson | B25J 9/1689 |

FOREIGN PATENT DOCUMENTS

| | | |
|---|---|---|
| JP | 2018-24997 A | 2/2018 |
| JP | 2018-053664 A | 4/2018 |
| JP | 2020-125599 A | 8/2020 |
| WO | 2013-058247 A1 | 4/2013 |
| WO | 2019-189013 A1 | 10/2019 |

OTHER PUBLICATIONS

Chinese Office Action received in corresponding Chinese Application No. 202180065374.X dated Jun. 20, 2025.

* cited by examiner

LOADING WORK SUPPORT SYSTEM HAVING A FIRST POSITION CALCULATOR, A POSTURE DETECTOR AND A SECOND POSITION CALCULATOR

TECHNICAL FIELD

The present invention relates to a loading work support system that supports loading work in which a loader loads a cargo onto a transporter.

BACKGROUND ART

In recent years, in the field of construction machines such as excavators, introduction of information-oriented construction for streamlining construction by efficiently utilizing various types of information by applying information communication technology to construction work has been advanced. For example, there is one having a function of supporting an operation of an operator, such as machine guidance for displaying, to the operator, a position and a posture of an articulated work device in which a plurality of driven members such as a boom, an arm, and a bucket are connected, and machine control for controlling the work device to move along a target construction surface.

When operation support such as machine guidance and machine control is performed, using coordinates of the subject vehicle in the construction site is referred to as three-dimensional information-oriented construction (hereinafter, referred to as 3D information-oriented construction). A construction machine compatible with 3D information-oriented construction includes a global navigation satellite system (GNSS) in order to acquire a position of a subject vehicle. The GNSS receives positioning signals from a plurality of satellites and measures a three-dimensional position (latitude, longitude, altitude) of the subject vehicle. In a construction machine including a work device such as an excavator, not only the position of the subject vehicle but also the direction (azimuth) in which the work device faces are necessary for operation support. Therefore, there is known a construction machine equipped with two GNSS antennas that receive positioning signals and specifying the azimuth of the work device based on the positioning signals received by the GNSS antennas.

In general information-oriented construction in an excavator, finishing excavation is performed using machine control after rough excavation of earth and sand. At the time of rough excavation, unnecessary earth and sand are generated in the site, and thus, it is necessary to load the earth and sand on a transporter such as a dump truck and transport the earth and sand from the site. "Loading work (loading work)" of loading earth and sand in a bucket of an excavator onto a loading table of a dump truck occurs frequently in a rough excavation process. Therefore, by providing operation support for the loading work, it is possible to expect a reduction in the workload of the operator. In particular, in the loading work, there is a possibility that the bucket comes into contact with the dump truck in the process of moving the bucket above the loading table of the dump truck. Therefore, if the operation of avoiding contact can be realized by automatic control, the safety of the construction site is improved. In a construction site, since a dump truck does not travel on a paved road when approaching an excavator, a positional relationship between the dump truck and the excavator is often different for each loading work.

Note that the loading work is a typical work between the excavator and the dump truck, but this work is not limited to the construction machine. For example, work in which a work robot operating in a factory or a warehouse loads a cargo onto a forklift or a transport vehicle can be similarly referred to as loading work. In the case of work in a factory or a warehouse, work of collecting the loaded cargo is also required. Also during this collection work, it is required that the work robot safely collects the cargo without contacting the transport vehicle. A technique of avoiding contact at the time of such collection work is also necessary in the case of loading and unloading of a container from a ship (for example, a tanker) or loading and unloading of a cargo from a transport vehicle by a crane in harbor work. However, in work in a factory, a warehouse, or a harbor, a dedicated lane is prepared for a transport vehicle, and movement of the transport vehicle is monitored by a plurality of environmental sensors. For this reason, the positional relationship between the excavator and the dump truck does not greatly differ for each loading work as in the case of the excavator and the dump truck.

A technique described in PTL 1 is known as a support function for loading work having poor reproducibility of a positional relationship between the two. The technique described in PTL 1 corrects a trajectory of a work machine (bucket) of a front work device when a swinging body of a construction machine swings to transport an excavation object to a loading table of a dump truck, determines whether the trajectory of the work machine predicted from a speed and acceleration of the work machine intersects an area of the dump truck by using position information of both the excavator and the dump truck, and performs at least one of control of decreasing a swing speed of the swinging body and control of increasing a rising speed of the front work device when it is determined that the trajectory of the work machine intersects the area.

CITATION LIST

Patent Literature

PTL 1: JP 2018-24997 A

SUMMARY OF INVENTION

Technical Problem

In the technique described in PTL 1, it is assumed that loading work of a construction machine onto a dump truck is executed by a combined operation of a swing operation and an operation of a front work device. However, depending on the positional relationship between the construction machine and the dump truck, the loading work may be performed without the swing operation. For example, this is a case where a dump truck is positioned directly in front of a front work device of a construction machine. In this case, in the technique described in PTL 1, only increasing the rising speed of the front work device can be executed as the support operation for avoiding contact between the work machine of the construction machine and the dump truck, and there is a case where it is difficult to support the operation of the loading work.

The present invention has been made based on the above matters, and an object of the present invention is to provide a loading work support system capable of reliably supporting loading work regardless of a positional relationship between a loader and a transporter.

Solution to Problem

The present application includes a plurality of means for solving the above problems, and an example thereof is a loading work support system that supports a loading work of loading a cargo by a loader including an articulated work device configured by rotatably connecting a plurality of driven members onto a transporter including a loading table, the loading work support system comprising: a first position calculator that calculates a position and an azimuth of the loader; a posture detector that detects a posture of the work device; a second position calculator that calculates a position and an azimuth of the transporter; and a control device that controls an operation of the loader, the control device executing: setting a target position, which is a position to be reached by the work device in the loading work, based on an output of the second position calculator; setting a prohibited area, which is an area where entry of the work device is prohibited, based on an output of the second position calculator; performing prediction calculation of predicting a trajectory of the work device in a finite prediction time section using an output of the first position calculator, an output of the posture detector, and dynamic characteristics of the work device; determining whether or not the work device enters the prohibited area in the prediction time section based on a calculation result of trajectory prediction of the work device; when it is determined that the work device does not enter the prohibited area, calculating a first input that is an input of the dynamic characteristics of the work device such that a distal end of the work device approaches the target position in the prediction time section based on the calculation result of trajectory prediction of the work device; when it is determined that the work device enters the prohibited area, calculating a second input that is an input of the dynamic characteristics of the work device such that the distal end of the work device approaches a position different from the target position outside the prohibited area and closer to the target position than the position of the distal end of the work device in the prediction time section; calculating a control input for controlling an operation of the loader based on the calculated first input and second input of the dynamic characteristics of the work device; and controlling the loader based on the calculated control input.

Advantageous Effects of Invention

According to an example of the present invention, by using the control input of the loader calculated under the constraint condition that the distal end of the work device does not enter the prohibited area on the basis of the calculation result of the trajectory prediction of the work device using the dynamic characteristics of the work device of the loader, the operation of the loader can be controlled such that the distal end of the work device avoids the prohibited area and approaches the target position of the loading work. Therefore, it is possible to reliably support the loading work regardless of the positional relationship between the loader and the transporter.

Objects, configurations, and effects other than those described above will be clarified by the following description of embodiments.

DESCRIPTION OF EMBODIMENTS

Hereinafter, an embodiment of a loading work support system of the present invention will be described with reference to the drawings.

First Embodiment

Figure 1:
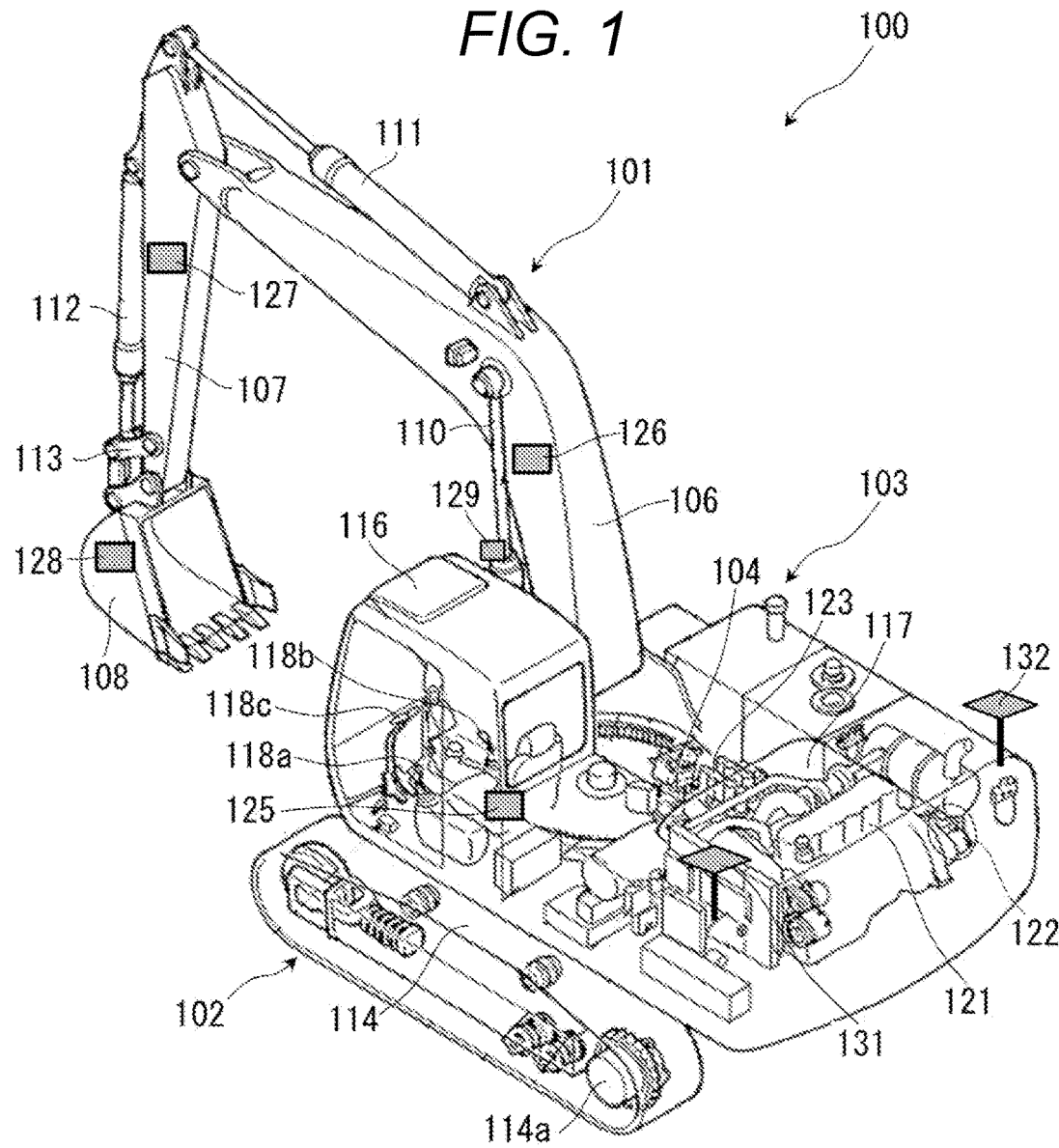
FIG. 1 is a perspective view illustrating an excavator which is an example of a loader to be supported in a first embodiment of a loading work support system of the present invention.

First, a configuration of an excavator which is an example of a loader side to be supported in a first embodiment of a loading work support system of the present invention will be described with reference to FIG. 1. FIG. 1 is a perspective view illustrating an excavator which is an example of a loader to be supported in a first embodiment of a loading work support system of the present invention. Here, a description will be given using a direction viewed from the operator seated on the driver's seat.

In FIG. 1, an excavator 100 is a type of loader that loads a cargo onto a transporter, and loads earth and sand, ore, and the like as a cargo. The excavator 100 includes a front work device 101 that performs excavation work, loading work, and the like, and a vehicle body to which the front work device 101 is rotatably attached. The vehicle body includes a self-propelled lower traveling body 102 and an upper swinging body 103 swingably mounted on the lower traveling body 102.

The front work device 101 is an articulated type configured by connecting a plurality of driven members so as to be rotatable in the vertical direction. The plurality of driven members includes, for example, a boom 106, an arm 107, and a bucket 108. A base end of the boom 106 is rotatably supported in a vertical direction by a front portion of the upper swinging body 103. A proximal end of the arm 107 is rotatably supported by a distal end of the boom 106. A bucket 108 is rotatably supported at a distal end of the arm 107. The bucket 108 as a work tool is disposed at a distal end of the front work device 101. The boom 106, the arm 107, and the bucket 108 are driven by a boom cylinder 110, an arm cylinder 111, and a bucket cylinder 112 which are hydraulic actuators, respectively. The bucket 108 is driven via a link member 113 that rotates in conjunction with the bucket 108.

The lower traveling body 102 includes, for example, crawler type traveling devices 114 (only one side is illustrated) on the left and right. The traveling device 114 is driven by a traveling hydraulic motor 114a which is a hydraulic actuator.

The upper swinging body 103 is configured to be swung with respect to the lower traveling body 102 by, for example, a swinging hydraulic motor 104 which is a hydraulic actuator. The upper swinging body 103 includes a cab 116 on which an operator boards and a machine room 117 that houses various devices.

Operation devices 118a, 118b, and 118c for operating the hydraulic actuators 104, 110, 111, 112, and 114a are provided in the cab 116. The operation devices 118a and 118b are, for example, electric operation lever devices having operation levers tiltable forward, backward, left, and right. The electric operation lever devices 118a and 118b each include a detection device (not illustrated) that electrically detects a tilt direction and a tilt amount of the operation lever, that is, an operation direction and an operation amount, and output an operation signal corresponding to the detected operation direction and operation amount to an excavator controller 10 (see FIG. 5 to be described later) via electric wiring. The operations in the front-rear direction and the left-right direction of the operation lever devices 118a and 118b are assigned as the operations of the hydraulic actuators 104, 110, 111, and 112, respectively. That is, each operation of the operation lever devices 118a and 118b is assigned as an operation of the front work device 101, a swing operation of the upper swinging body 103, or the like. The operation device 118c is an electric operation device having a traveling lever and a traveling pedal that can be tilted back and forth. The operation device 118c is assigned as an operation of the hydraulic actuator 114a, that is, a traveling operation of the left and right traveling devices 114.

In the machine room 117, a prime mover 121 such as an engine or an electric motor, a hydraulic pump device 122 driven by the prime mover 121, and the like are disposed. The hydraulic actuators 104, 110, 111, 112, and 114a are driven by supply of the pressurized oil discharged from the hydraulic pump device 122. The driving of the hydraulic actuators 104, 110, 111, 112, and 114a is controlled by a control valve unit 123 that is an assembly of control valves corresponding to the hydraulic actuators 104, 110, 111, 112, and 114a. Each control valve constituting the control valve unit 123 controls the direction and flow rate of the pressure oil supplied from the hydraulic pump device 122 to the corresponding hydraulic actuators 104, 110, 111, 112, and 114a. The driving of each control valve is controlled by, for example, pilot pressure output from a pilot pump (not illustrated) via an electromagnetic proportional valve (not illustrated). The operation of each of the hydraulic actuators 104, 110, 111, 112, and 114a is controlled via each control valve of the control valve unit 123 by the excavator controller 10 controlling each of the electromagnetic proportional valves on the basis of operation signals from the operation devices 118a, 118b, and 118c.

Note that the operation devices 118a, 118b, and 118c can be configured not by an electric type but by a hydraulic type. In this case, each of the hydraulic actuators 104, 110, 111, 112, and 114a is driven by supplying the pilot pressure corresponding to the operation direction and the operation amount of each of the operation devices 118a, 118b, and 118c to each of the control valves of the control valve unit 123.

An inertial measurement unit (IMU) 125 is installed in the upper swinging body 103. In addition, inertial measurement units (IMU) 126, 127, and 128 are also installed in the boom 106, the arm 107, and the bucket 108 constituting the front work device 101, respectively. In order to distinguish these four inertial measurement units, the inertial measurement unit 125 for the upper swinging body 103 (vehicle body) is referred to as a vehicle body IMU, the inertial measurement unit 126 for the boom 106 is referred to as a boom IMU, the inertial measurement unit 127 for the arm 107 is referred to as an arm IMU, and the inertial measurement unit 128 for the bucket 108 is referred to as a bucket IMU. The bucket IMU 128 can be installed not in the bucket 108 but in the link member 113 that rotates in conjunction with the bucket 108.

Each of the IMUs 125, 126, 127, and 128 detects acceleration and angular velocity generated in the installation portions 103, 106, 107, and 108, and calculates angles of the installation portions 103, 106, 107, and 108 on the basis of the detected acceleration and angular velocity. These four IMUs 125 to 128 function as posture detectors that detect the posture of the front work device 101 by detecting the acceleration and the angular velocity of the vehicle bodies 102 and 103 and the components 106, 107, and 108 of the front work device 101 and performing angle calculation based on the acceleration and the angular velocity of the detection result.

For example, when the upper swinging body 103 is in a stationary state, the vehicle body IMU 125 can calculate the inclination (pitch angle) of the upper swinging body 103 in the front-rear direction and the inclination (roll angle) of the upper swinging body 103 in the left-right direction (width direction) with respect to the horizontal plane based on the direction (vertically downward direction) of the gravitational acceleration detected in the IMU coordinate system set in the vehicle body IMU and the attachment state of the vehicle body IMU 125 (relative positional relationship between the vehicle body IMU 125 and the upper swinging body 103). In addition, the vehicle body IMU 125 can calculate the angular change from the reference time point by temporally integrating the detected angular velocity. The vehicle body IMU 125 outputs the detection results of the acceleration and the angular velocity of the vehicle bodies 102 and 103 and the calculation results of the angles of the vehicle bodies 102 and 103 to the excavator controller 10. The boom IMU 126, the arm IMU 127, and the bucket IMU 128 are similar to the vehicle body IMU 125.

Note that, in the present embodiment, it is assumed that each of the IMUs 125, 126, 127, and 128 has an angle calculation function of calculating angle information of the installation portion on the basis of detection results of acceleration and angular velocity. However, when these IMUs 125 to 128 do not have the angle calculation function, the excavator controller 10 may be configured to have the angle calculation function.

A pressure sensor 129 that detects a cylinder pressure is installed in the boom cylinder 110. The pressure sensor 129 functions as a load detector that detects a load of the front work device 101, and outputs a detection result to the excavator controller 10. Based on the pressure of the boom cylinder 110 detected by the pressure sensor 129 and the posture information of the front work device 101 acquired by the IMU 125 to 128, it is possible to perform payload calculation for calculating the weight of earth and sand held in the bucket 108. Note that a pressure sensor can also be provided in the arm cylinder 111 and the bucket cylinder 112. The pressure sensor can be used for controlling the operation of the excavator 100 by the loading work support system 1 described later.

Two GNSS antennas 131 and 132 capable of receiving positioning signals from a plurality of satellites are attached to the upper swinging body 103. The positioning signal received by each of the GNSS antennas 131 and 132 is input to a GNSS receiver 133 (see FIG. 5 described later) The GNSS receiver 133 performs positioning calculation such as calculation of antenna coordinates (specific position of the excavator 100) and calculation of azimuth of the upper swinging body 103 on the basis of positioning signals received by the GNSS antennas 131 and 132. The GNSS receiver 133 outputs the position, speed, and azimuth of the excavator 100 (upper swinging body 103), which are calculation results of positioning calculation, to the excavator controller 10. The GNSS antennas 131 and 132 and the GNSS receiver 133 constitute a positioning system that performs satellite positioning for the excavator 100. The GNSS antennas 131 and 132 function as position detectors that detect the position, and the GNSS receiver 133 functions as a self-position calculator (first position calculator) that calculates the position and azimuth of the excavator 100 itself.

The GNSS receiver 133 can perform real time kinematic (RTK) positioning by being connected to a GNSS fixed station installed in a site via wireless communication. In a case of a site where there is no GNSS fixed station, positioning using a network type RTK that acquires information of an electronic reference station via the Internet can be executed. Hereinafter, it is assumed that the GNSS receiver 133 can execute RTK positioning regardless of the presence or absence of a fixed station in the site.

Figure 2:
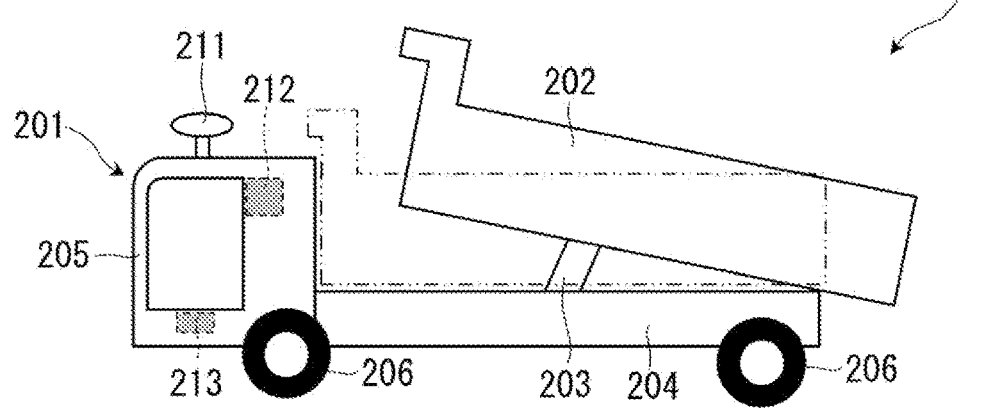
FIG. 2 is a diagram schematically illustrating an appearance of a dump truck which is an example of a transporter to be supported in the first embodiment of the loading work support system of the present invention.

Next, a configuration of a dump truck, which is an example of the transporter side of the support target in the first embodiment of the loading work support system of the present invention, will be described with reference to FIG. 2. FIG. 2 is a diagram schematically illustrating an appearance of a dump truck which is an example of a transporter to be supported in the first embodiment of the loading work support system of the present invention.

In FIG. 2, a dump truck 200 is a type of transporter that transports a cargo, and transports earth and sand, ore, and the like as a cargo. The dump truck 200 substantially includes a self-propelled vehicle body 201 and a loading table 202 which is mounted on the vehicle body 201 in a tiltable manner and on which cargo is loaded. The vehicle body 201 includes a vehicle body frame 204 that is a support structure extending in the front-rear direction (left and right direction in FIG. 2), a cab 205 disposed at the front end of the vehicle body frame 204, and wheels 206 rotatably provided on both left and right sides of the front and rear of the vehicle body frame 204. A hoist cylinder 203 is attached to the vehicle body frame 204 and the bottom portion of the loading table 2. The hoist cylinder 203 is, for example, a telescopic hydraulic cylinder. The loading table 202 tilts with respect to the vehicle body frame 204 between a transport position (indicated by a two-dot chain line) at the time of transporting the cargo and an earth and sand release position (indicated by a solid line) at the time of releasing the cargo from the loading table 202 by expansion and contraction of the hoist cylinder 203.

A power train (not illustrated) such as an engine or a transmission is disposed behind the cab 205 or in the vehicle body frame 204, and the movement (traveling operation) of the wheels 206 is controlled by controlling the power train.

An accelerator pedal and a brake pedal (not illustrated) are disposed in the cab 205, and the rotation operation of the wheels 206 is controlled according to the operation of the accelerator pedal and the brake pedal. For example, when a brake operation is performed, a brake pad (not illustrated) attached to the wheel 206 is pressed against the wheel 206, so that forward and backward movement of the dump truck 200 can be stopped. Control of the power train and the brake is executed via a truck controller 20 (see FIG. 5 to be described later) to be described later.

In the cab 205, a GNSS antenna 211 and a GNSS receiver 212 are installed. In the cab 205, an inertial measurement unit 213 (hereinafter, referred to as a truck IMU) capable of detecting acceleration and angular velocity of the dump truck 200 is installed. FIG. 2 illustrates a configuration in which the GNSS antenna 211 is disposed outside the cab 205, but a configuration in which a small antenna is disposed in the cab 205 is also possible.

The GNSS antenna 211 can be configured by two antennas, for example, as in the case of the excavator 100. In this case, the GNSS receiver 212 can calculate the azimuth of the dump truck 200 in addition to the calculation of the position (coordinates) of the dump truck 200 on the basis of the positioning signals received by the two GNSS antennas 211. On the other hand, in a case where the GNSS antenna 211 is configured by one antenna, it is also possible to configure the GNSS antenna 211 such that the GNSS receiver 212 calculates only the position (coordinates) of the dump truck 200, and the truck controller 20 calculates the azimuth of the dump truck 200 on the basis of the previous traveling trajectory of the dump truck 200 and the angular velocity detected by the truck IMU 213. Furthermore, the GNSS receiver 212 can also calculate the moving speed of the dump truck 200 on the basis of the Doppler shift detected by the GNSS antenna 211.

The GNSS receiver 212 outputs a position, an azimuth, a moving speed, and the like of the dump truck 200, which are calculation results of the positioning calculation, to the truck controller 20. The truck IMU 213 outputs the detected acceleration and angular velocity to the truck controller 20. The GNSS antenna 211 functions as a position detector that detects a position, and the GNSS receiver 212 functions as a self-position calculator (second position calculator) that calculates a position and an azimuth of the dump truck 200. The truck IMU 213 functions as a posture detector that detects the posture of the dump truck 200.

Figure 3:
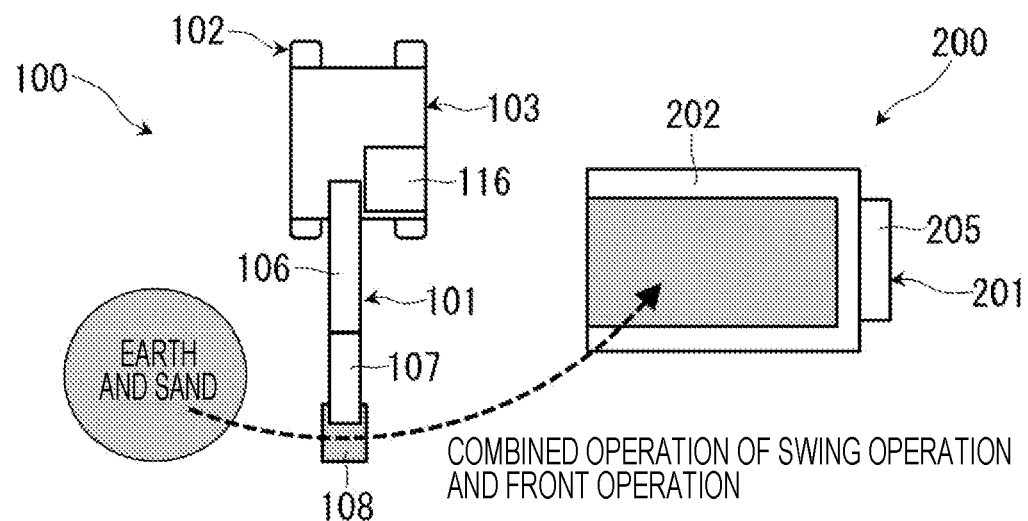
FIG. 3 is an explanatory diagram illustrating an example of operation in loading work of the excavator onto the dump truck.
Figure 4:
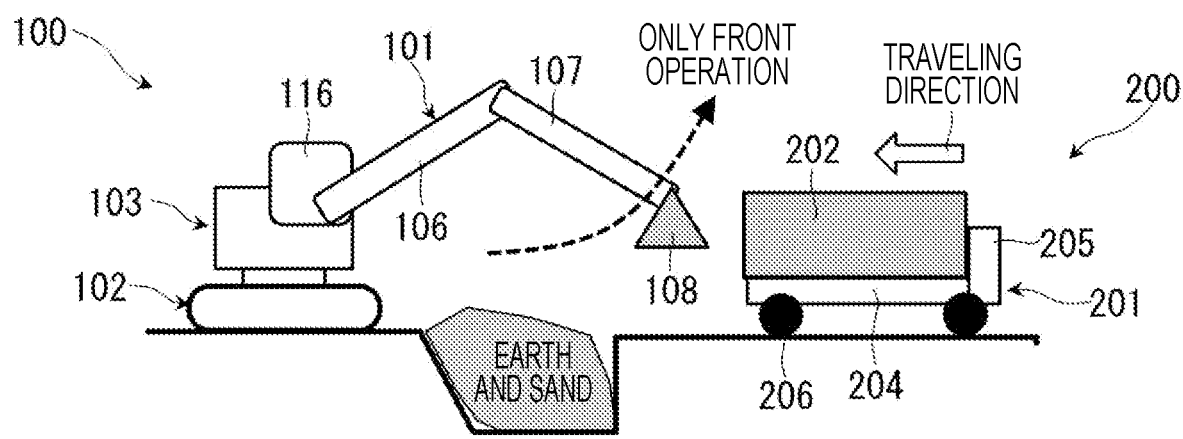
FIG. 4 is an explanatory diagram illustrating another example of the operation in the loading work of the excavator onto the dump truck.

Next, the operation of the excavator in the loading work of the excavator onto the dump truck will be described with reference to FIGS. 3 and 4. FIG. 3 is an explanatory diagram illustrating an example of operation in loading work of the excavator onto the dump truck. FIG. 4 is an explanatory diagram illustrating another example of the operation in the loading work of the excavator onto the dump truck.

The work of loading earth and sand on the dump truck 200 by the excavator 100 is performed by a combined operation combining the swing operation of the upper swinging body 103 and the operation of the front work device 101 in a case where the excavator 100 is positioned between the earth and sand and the dump truck 200 as illustrated in FIG. 3, for example. On the other hand, as illustrated in FIG. 4, in the case of the positional relationship in which the earth and sand and the dump truck 200 are arranged on a straight line directly in front of the excavator 100, the loading work is performed only by the operation of the front work device 101.

Even when the positional relationship between the excavator 100 and the dump truck 200 is illustrated in FIG. 3 or FIG. 4, it is desirable to be able to execute work support of loading work of the excavator 100 on the dump truck 200. In the present embodiment, the loading work support system 1 capable of executing a support operation for avoiding contact between the front work device 101 of the excavator 100 and the dump truck 200 regardless of the positional relationship between the excavator 100 and the dump truck 200 is constructed.

Figure 5:
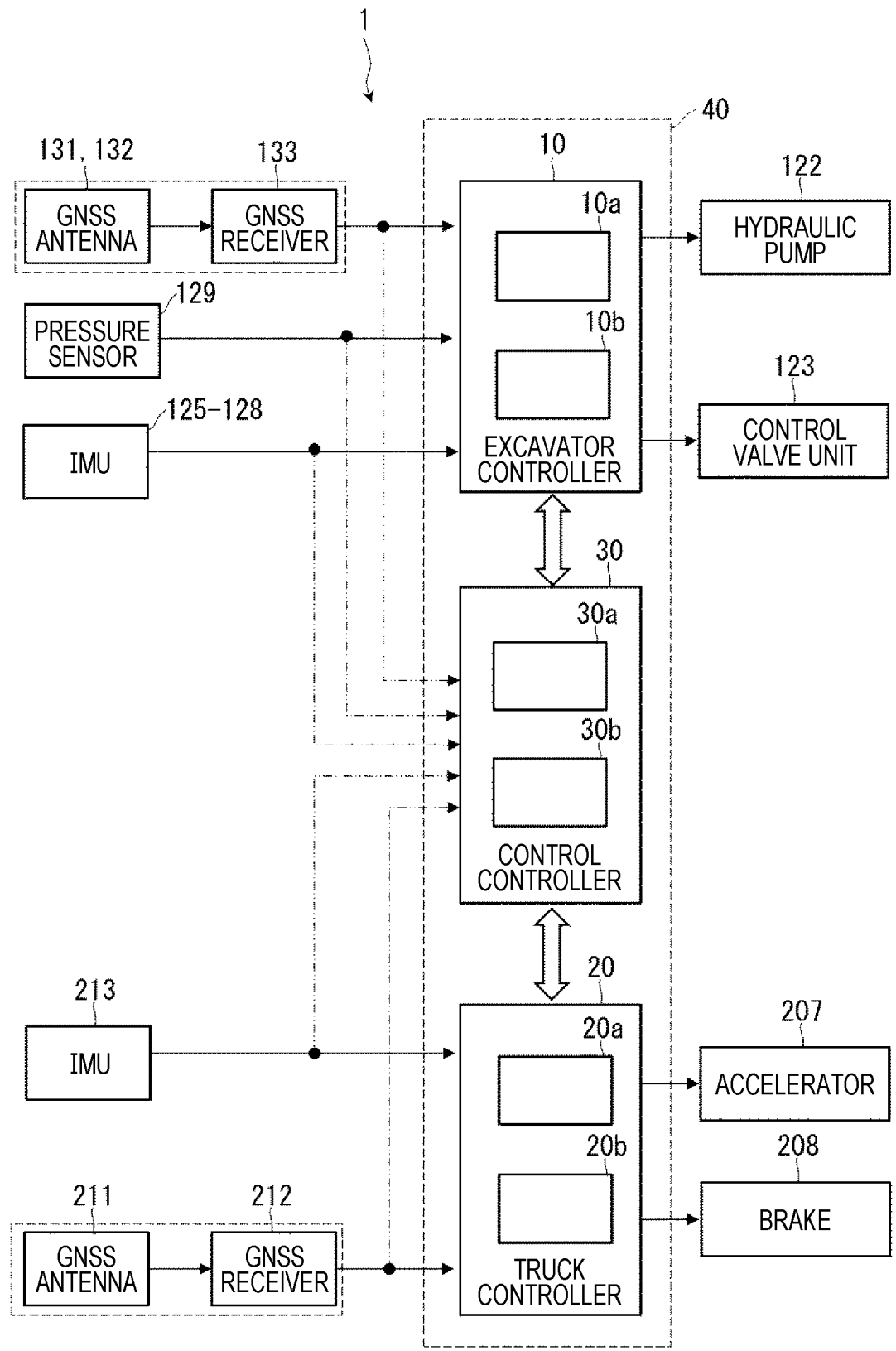
FIG. 5 is a block diagram illustrating a schematic configuration of the first embodiment of the loading work support system of the present invention.

Next, a configuration of a first embodiment of a loading work support system of the present invention will be described with reference to FIG. 5. FIG. 5 is a block diagram illustrating a schematic configuration of a first embodiment of the loading work support system of the present invention.

The loading work support system 1 includes, for example, an excavator controller 10 that controls the operation of the excavator 100 (see FIG. 1), a truck controller 20 that controls the operation of the dump truck 200 (see FIG. 2), and a control controller 30. The excavator controller 10 and the truck controller 20 are mounted on the excavator 100 and the dump truck 200, respectively. The control controller 30 is configured by, for example, a computer (server), and manages operating states of the excavator 100 and the dump truck 200. The control controller 30 can be installed in an arbitrary place such as a construction site or a place away from the construction site. The control controller 30 may be mounted on the excavator 100.

The excavator controller 10 calculates control commands (tilt angle, electromagnetic valve operation pressure, and the like) for the control valves and the like of the hydraulic pump device 122 and the control valve unit 123 (see FIG. 1) according to the operation direction and the operation amount of the operation devices 118a, 118b, and 118c (see FIG. 1), and controls the behavior of various hydraulic actuators 104, 110, 111, 112, and 114a (see FIG. 1). The information on the position and azimuth of the excavator output from the GNSS receiver 133 as a self-position calculator, the cylinder pressure output from the pressure sensor 129 as a load detector, and the angle and angular velocity (posture information) output from the plurality of IMUs 125 to 128 as posture detectors are input to the excavator controller 10.

The truck controller 20 controls the movement of the dump truck 200 by controlling the operations of the accelerator 207 and the brake 208. Information on the position and azimuth, if available, of the dump truck 200 output by the GNSS receiver 212 serving as a self-position calculator, and information on the angular velocity output by the IMU 213 serving as a posture detector are input to the truck controller 20.

The excavator controller 10, the truck controller 20, and the control controller 30 each have a communication function, and can be connected to each other via a communication network. The control controller 30 exchanges various types of information described above with the excavator controller 10 and the truck controller 20 by the communication function. Note that the control controller 30 can also be configured to directly acquire various types of information output from various sensors 125 to 129, 133, and 212 to 213 without via the excavator controller 10 and the truck controller 20 (see two-dot chain line in FIG. 5). In this case, as various sensors 125 to 129, 133, and 212 to 213, those having a communication function in advance may be adopted, or in a case where various sensors do not have a communication function, a communication unit may be separately added.

In the present embodiment, an assembly of three controllers of the excavator controller 10, the truck controller 20, and the control controller 30 is a control device of the loading work support system 1, and a function realized by the control device is referred to as a support system control unit 40. Each of the controllers 10, 20, and 30 includes, as a hardware configuration, storage devices 10a, 20a, and 30a including a RAM, a ROM, or the like, and processing devices 10b, 20b, and 30b including a CPU, an MPU, or the like, for example. In the storage devices 10a, 20a, and 30a, a program and various types of information necessary for supporting loading work of the excavator 100 on the dump truck 200 are stored in advance. The processing devices 10b, 20b, and 30b appropriately read programs and various types of information from the storage devices 10a, 20a, and 30a, and execute processing according to the programs, thereby realizing various functions including the following functions of the support system control unit 40.

Figure 6:
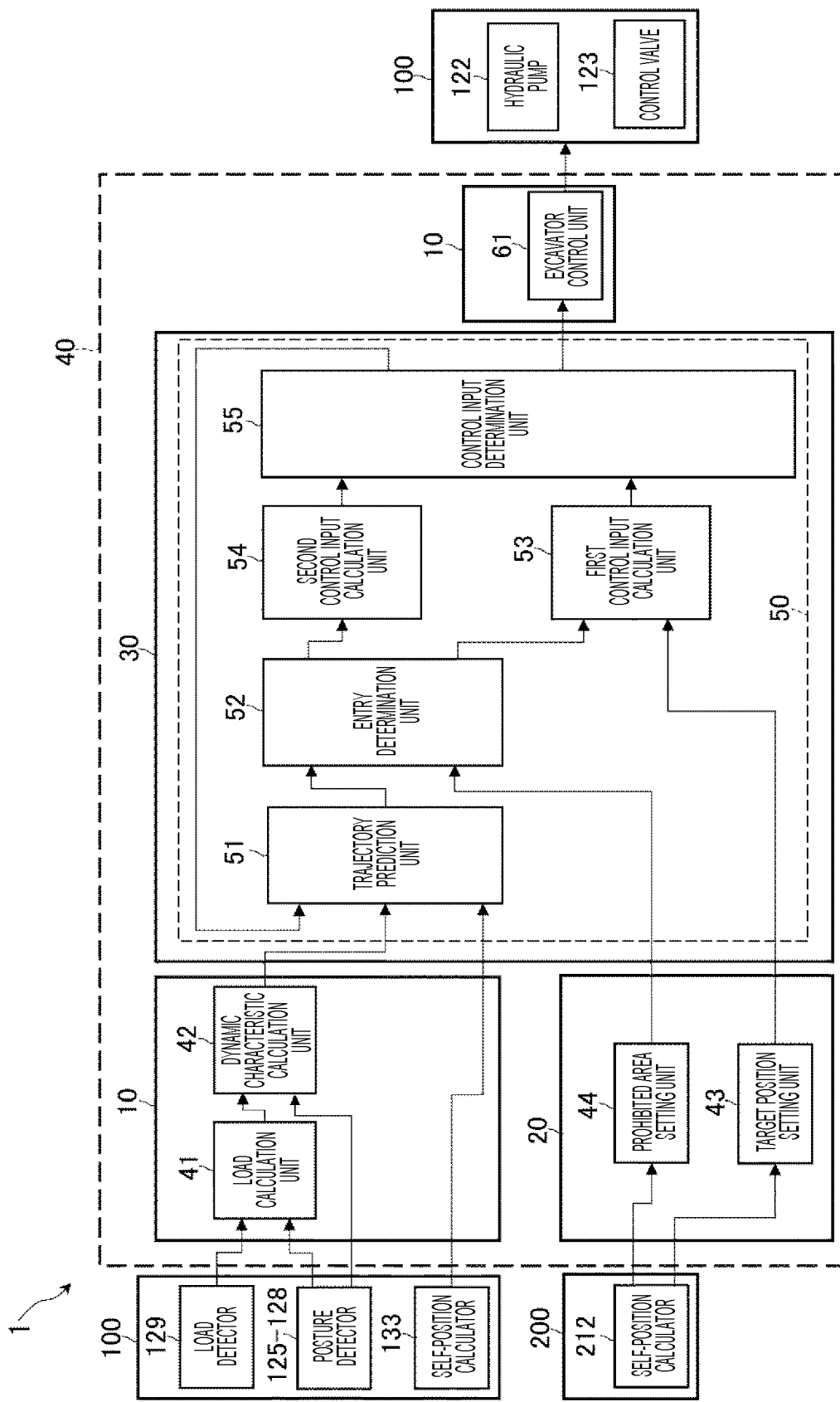
FIG. 6 is a block diagram illustrating a functional configuration of the first embodiment of the loading work support system of the present invention illustrated in FIG. 5.

Next, a configuration of a functional unit of the first embodiment of the loading work support system of the present invention will be described with reference to FIGS. 6 to 12. FIG. 6 is a block diagram illustrating a functional configuration of the first embodiment of the loading work support system of the present invention illustrated in FIG. 5.

In FIG. 6, the support system control unit 40 as the control device of the loading work support system 1, schematically, performs calculation of predicting the trajectory of the front work device 101 (see FIG. 1) using the model (dynamic characteristics) of the excavator 100 in the loading work of the excavator 100 (see FIG. 1) on the dump truck 200 (see FIG. 2), calculates the control input under the constraint condition of avoiding the contact between the excavator 100 and the dump truck 200 using the prediction result, and controls the excavator 100 based on the calculated control input.

In the support system control unit 40 of the present embodiment, for example, the load calculation unit 41, the dynamic characteristics calculation unit 42, and the excavator control unit 61 are mounted on the excavator controller 10. The target position setting unit 43 and the prohibited area setting unit 44 are mounted on the truck controller 20. In addition, the control input calculation unit 50 is mounted on the control controller 30. The control input calculation unit 50 includes, for example, a trajectory prediction unit 51, an entry determination unit 52, a first control input calculation unit 53, a second control input calculation unit 54, and a control input determination unit 55. The above-described distribution of the functional units 41 to 44, 51 to 55, and 61 to the controllers 10, 20, and 30 is an example, and the distribution of the functional units 41 to 44, 51 to 55, and 61 is arbitrary as long as the same function can be realized. Note that, in a case where there is no physical connection among the three controllers, a communication function is required for each controller, but the communication function is omitted for simplification of the drawing.

The load calculation unit 41 calculates the weight (load) of the earth and sand (cargo) scooped and held by the bucket 108 of the excavator 100 based on the output of the load detector 129 and the output of the posture detectors 125 to 128. Specifically, the weight of earth and sand can be calculated from the support force of the hydraulic cylinder 110 of the front work device 101 and the moment of the force acting on the front work device 101 calculated based on the cylinder pressure detected by the pressure sensor 129 and the posture information detected by the IMUs 125 to 128. Here, the weight of the earth and sand which is the calculation result from the load calculation unit 41 is represented by $m_{BK}$.

Figure 7:
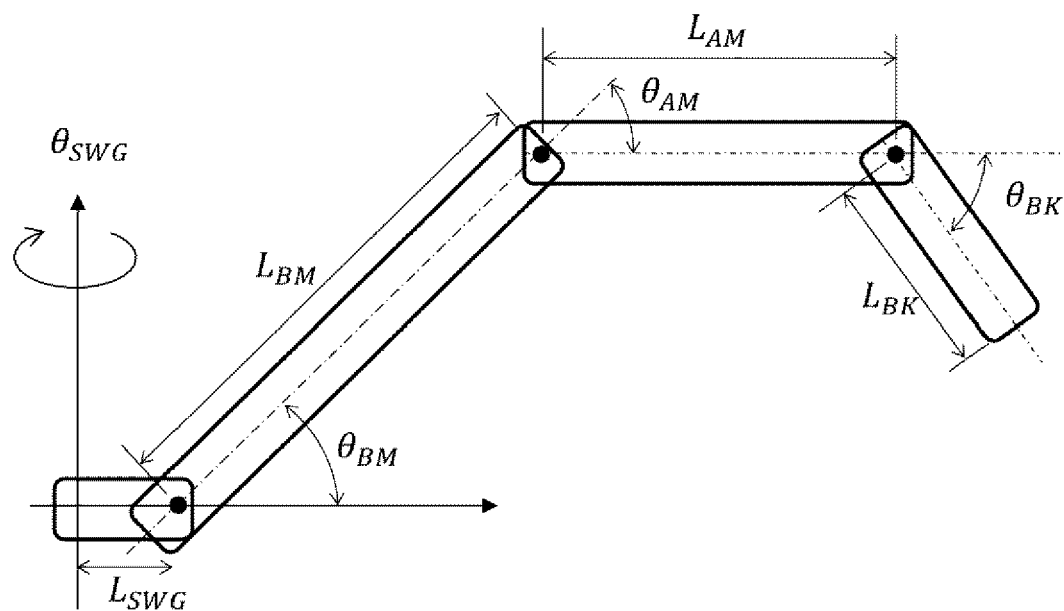
FIG. 7 is an explanatory diagram illustrating a model of a front work device used in a dynamic characteristics calculation unit constituting a part of the first embodiment of the loading work support system of the present invention illustrated in FIG. 6.

The dynamic characteristics calculation unit will be described with reference to FIG. 7. FIG. 7 is an explanatory diagram illustrating a model of a front work device used in dynamic characteristics calculation unit constituting a part of the first embodiment of the loading work support system of the present invention illustrated in FIG. 6.

The dynamic characteristics calculation unit 42 calculates dynamic characteristics (model) of the front work device 101 of the excavator 100 in consideration of the weight of the earth and sand as a calculation result from the load calculation unit 41. For example, a motion equation can be adopted as the dynamic characteristics of the front work device 101. The motion equation when the bucket 108 is in the unloaded state can be derived in advance by acquiring the dimensions of the driven members 106, 107, and 108 of the front work device 101 and the moment of inertia of the front work device 101 in advance. The dynamic characteristics calculation unit 42 is used as a function of adjusting a parameter of a motion equation derived when the bucket 108 is in an unloaded state on the basis of the weight $m_{BK}$ of the earth and sand as a calculation result from the load calculation unit 41.

For example, as illustrated in FIG. 7, the front work device 101 can simulate the boom 106, the arm 107, and the bucket 108 by a rigid link system. Using the link lengths $L_{SWG}$, $L_{BM}$, $L_{AM}$, $L_{BK}$, and the moment of inertia I of each rigid link, the motion equation of each link can be expressed by Formula (1) by the Euler-Lagrange equation.

[Mathematical Formula 1]

$$\dot{x} = f(x, u, I) \quad \text{Formula (1)}$$

$$x = \begin{bmatrix} \theta_{BM} \\ \theta_{AM} \\ \theta_{BK} \\ \theta_{SWG} \\ \omega_{BM} \\ \omega_{AM} \\ \omega_{BK} \\ \omega_{SWG} \end{bmatrix},$$

$$u = \begin{bmatrix} \tau_{BM} \\ \tau_{AM} \\ \tau_{BK} \\ \tau_{SWG} \end{bmatrix},$$

$$I = \begin{bmatrix} I_{BK} \\ I_{SWG} \end{bmatrix}$$

In Formula (1), θ, ω, and τ respectively represent the rotation angle and the angular velocity of each link, and the driving torque applied to the rotation axis of each link. In addition, in Formula (1) and FIG. 7, subscripts BM, AM, BK, and SWG indicate the boom 106, the arm 107, the bucket 108, and the upper swinging body 103, respectively.

The rotation operation of the rotation shaft of each link is realized by the expansion/contraction operation of the hydraulic cylinders 110 to 112 of the front work device 101 or the rotation operation of the swinging hydraulic motor 104. Therefore, the driving torque τ requires a conversion formula corresponding to the pressure p of the pressure oil acting on the hydraulic actuators 110 to 112 and 104 as in Formula (2). The detailed description of Formulas (1) and (2) is not essential to the present invention, and thus is omitted.

[Mathematical Formula 2]

$$\tau = g(p) \quad \text{Formula (2)}$$

$$p = \begin{bmatrix} p_{BM} \\ p_{AM} \\ p_{BK} \\ p_{SWG} \end{bmatrix}$$

The moment of inertia $I_{BK}$ of the bucket 108 in Formula (1) changes according to the weight (load) $m_{BK}$ of the earth and sand (cargo) calculated by the load calculation unit 41, and the moment of inertia $I_{SWG}$ of the upper swinging body 103 changes according to the posture of the front work device 101. As described above, since the operation of the excavator 100 strictly depends on the moment of inertia I, the motion equation (dynamic characteristics) of Formula (1) depends on the moment of inertia I. Therefore, in order to accurately predict the behavior of the front work device 101, it is necessary to use dynamic characteristics in consideration of the moment of inertia I.

Figure 8:
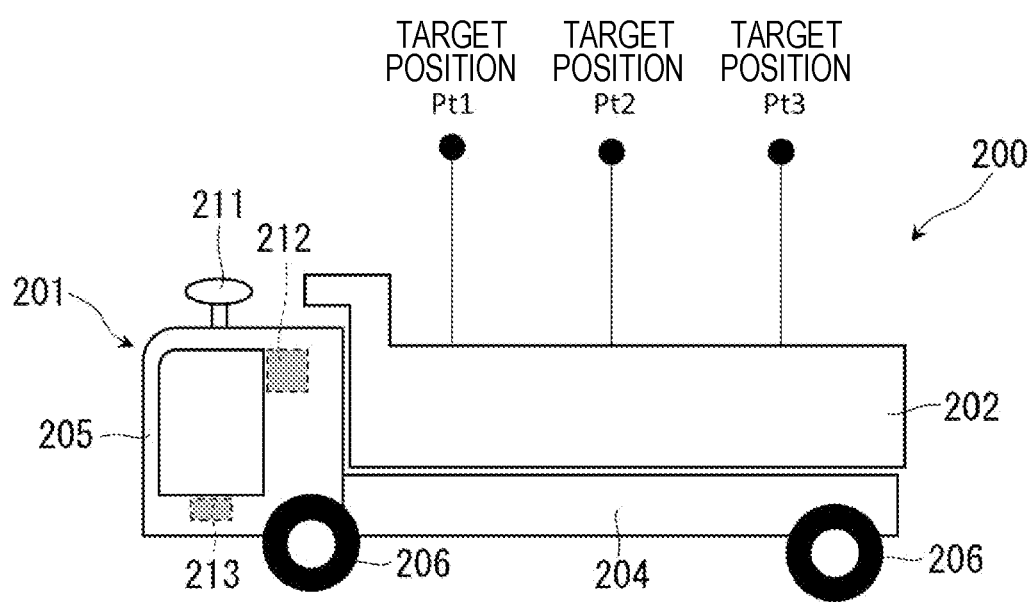
FIG. 8 is an explanatory diagram illustrating an example of a target position set by a target position setting unit constituting a part of the first embodiment of the loading work support system of the present invention illustrated in FIG. 6.

The target position setting unit will be described with reference to FIG. 8. FIG. 8 is an explanatory diagram illustrating an example of target positions set by the target position setting unit 43 constituting a part of the first embodiment of the loading work support system of the present invention illustrated in FIG. 6.

The target position setting unit 43 sets a target position as a position to be reached by the bucket 108 of the front work device 101 in the loading work on the basis of the information on the position and azimuth of the dump truck 200 output from the self-position calculator 212. Specifically, the target position is set above the loading table 202 of the dump truck 200. Unless the size of the dump truck 200 is smaller than that of the excavator 100, the loading work of the excavator 100 is generally executed a plurality of times until the dump truck 200 transports earth and sand (cargo) In such a case, it is desirable that the set target position is appropriately changed according to the number of times of loading. For example, in the case of a dump truck having a size requiring loading work three times, it is desirable to set target positions at three different positions with respect to the loading table 202 as illustrated in FIG. 8. For example, the first target position Pt1 in the loading work is set on the front side of the loading table 202, the second target position Pt2 is set on the center side of the loading table 202, and the third target position Pt3 is set on the rear side of the loading table 202.

Figure 9A:
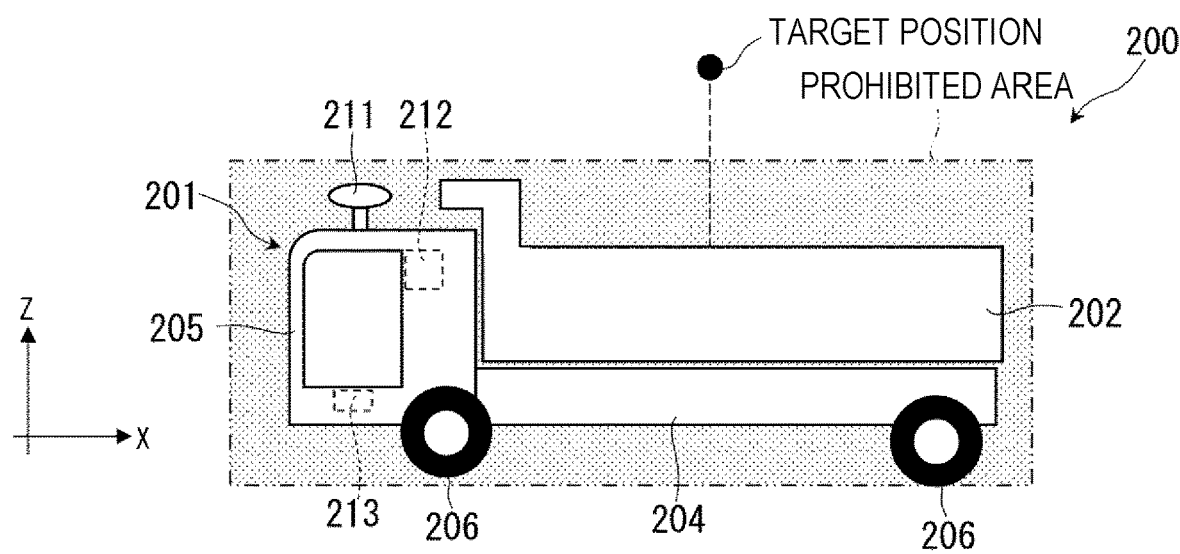
FIG. 9A is a diagram (a view of a side surface of a dump truck) illustrating an example of a prohibited area set by a prohibited area setting unit constituting a part of the first embodiment of the loading work support system of the present invention illustrated in FIG. 6.
Figure 9B:
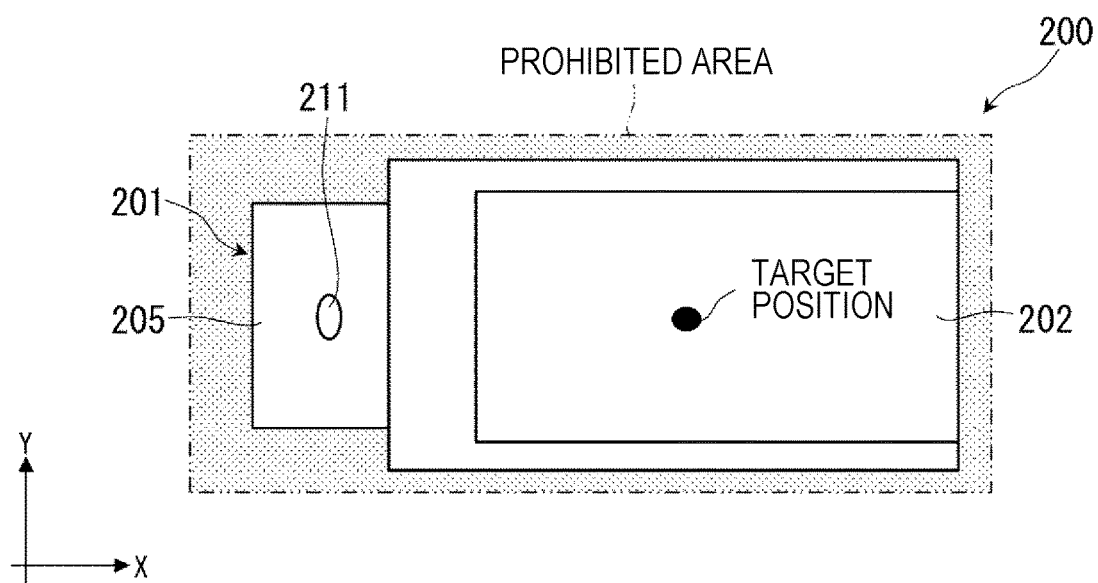
FIG. 9B is a diagram when the prohibited area illustrated in FIG. 9A is viewed from above the dump truck.
Figure 10:
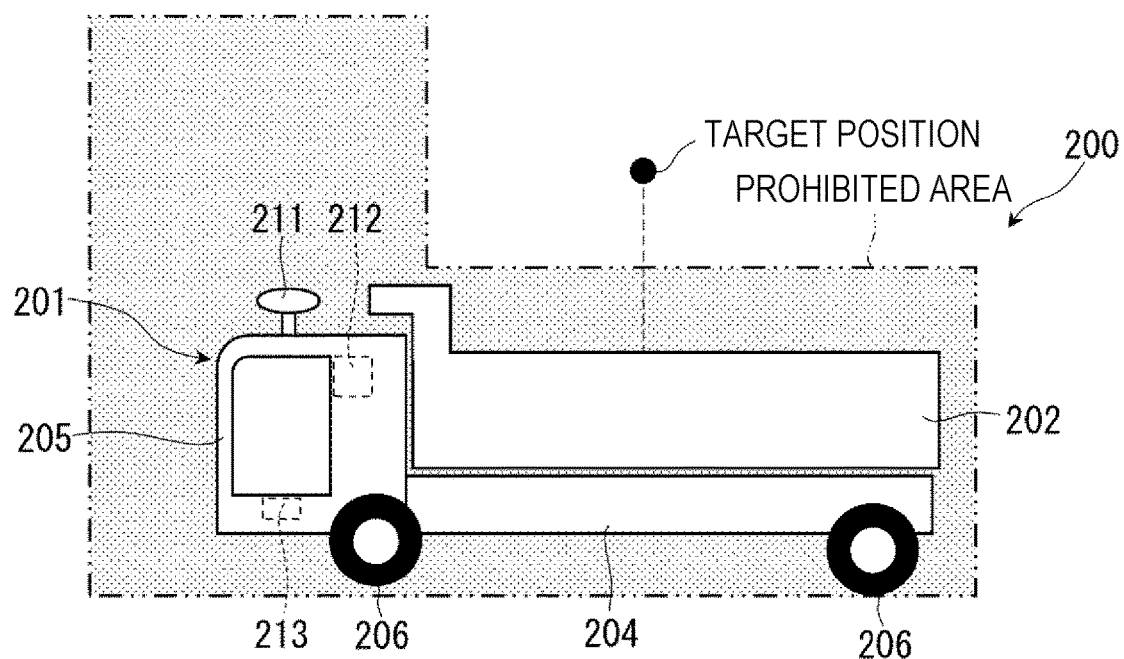
FIG. 10 is a diagram (a view of a side surface of a dump truck) illustrating a second example of a prohibited area set by a prohibited area setting unit constituting a part of the first embodiment of the loading work support system of the present invention illustrated in FIG. 6.
Figure 11:
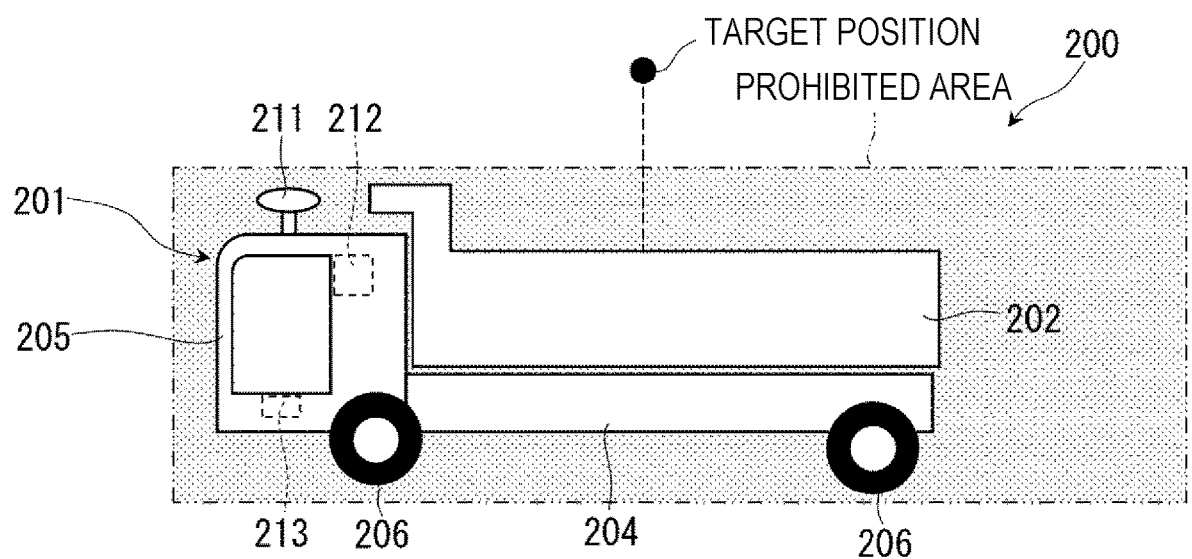
FIG. 11 is a diagram (a view of a side surface of a dump truck) illustrating a third example of a prohibited area set by a prohibited area setting unit constituting a part of the first embodiment of the loading work support system of the present invention illustrated in FIG. 6.

The prohibited area setting unit 44 will be described with reference to FIGS. 9 to 11. FIG. 9A is a diagram illustrating an example of a prohibited area set by a prohibited area setting unit constituting a part of the first embodiment of the loading work support system of the present invention illustrated in FIG. 6 (a diagram illustrating a side surface of a dump truck). FIG. 9B is a diagram when the prohibited area illustrated in FIG. 9A is viewed from above the dump truck. FIG. 10 is a diagram illustrating a second example of a prohibited area set by a prohibited area setting unit constituting a part of the first embodiment of the loading work support system of the present invention illustrated in FIG. 6 (a diagram illustrating a side surface of a dump truck) FIG. 11 is a diagram illustrating a third example of the prohibited area set by the prohibited area setting unit constituting a part of the first embodiment of the loading work support system of the present invention illustrated in FIG. 6 (a diagram illustrating a side surface of a dump truck).

The prohibited area setting unit 44 sets a prohibited area in which the front work device 101 is prohibited from entering on the basis of information on the position and azimuth of the dump truck 200 output from the self-position calculator 212. The prohibited area is set so as to surround the dump truck 200, for example, as illustrated in FIGS. 9A and 9B. Since the prohibited area is set so as to surround the dump truck 200, it is possible to control the support operation of the excavator 100 for avoiding contact with the dump truck 200.

For example, as illustrated in FIG. 10, the prohibited area can make the periphery of the cab 205 of the dump truck 200 wider than the prohibited area illustrated in FIGS. 9A and 9B. As a result, it is possible to avoid selection of the path of the front work device 101 that gives anxiety to the operator of the dump truck 200.

In addition, in a case where the dump truck 200 is moving, it is desirable to set the prohibited area to be wider than that at the time of stopping. For example, in a case where the dump truck 200 approaches a predetermined position by backward movement, as illustrated in FIG. 11, the prohibited area is set to be wide behind the dump truck. As a result, even in a case where the dump truck 200 approaches the excavator 100, safety can be enhanced.

Note that the detection of the moving speed of the dump truck 200 is based on the use of the GNSS receiver 212 since the output of the GNSS receiver 212 as the self-position calculator is highly accurate. However, as a detector that detects the moving speed of the dump truck 200, a vehicle speed sensor mounted on the dump truck 200 can be substituted.

The control input calculation unit 50 performs calculation to predict the trajectory of the front work device 101 in a finite time section using the model (dynamic characteristics) of the excavator 100, and calculates an input of the dynamic characteristics (control input to the excavator 100) to approach the target position of the loading work under the constraint condition that the distal end of the front work device 101 does not enter the above-described prohibited area on the basis of the calculation result of the trajectory prediction. Specifically, the control input calculation unit 50 includes, for example, the trajectory prediction unit 51 that performs calculation to predict a trajectory of the front work device 101, the entry determination unit 52 that determines whether a calculation result of trajectory prediction indicates that the front work device enters the above-described prohibited area, the first control input calculation unit 53 that calculates an input (control input) of dynamic characteristics under a certain condition in a case where it is determined that the calculation result of trajectory prediction indicates that the front work device does not enter the prohibited area, the second control input calculation unit 54 that calculates an input (control input) of dynamic characteristics under a condition different from the calculation of the first control input calculation unit 53 in a case where it is determined that the calculation result of trajectory prediction indicates that the front work device enters the prohibited area, and the control input determination unit 55 that determines a control input of the excavator 100 on the basis of the calculation result from the first control input calculation unit 53 and the calculation result from the second control input calculation unit 54.

The trajectory prediction unit 51 predicts a trajectory of the front work device 101 when a specific driving torque is input in a finite time section using a motion equation (model in which moment of inertia is determined) calculated by the dynamic characteristics calculation unit 42. Specifically, the trajectory of the front work device is predicted by performing an integration operation of a finite prediction time section (section from time $t_0$ to time $t_p$) according to Formula (3) based on the dynamic characteristics (model). In Formula (3), $u_p$ is a control input, and $x_0$ is an initial value of $x_p$.

[Mathematical Formula 3]

$$x_p = \int_{t_0}^{t_p} f(x_0, u_p) dt \qquad \text{Formula (3)}$$

$$u_p = \begin{bmatrix} \tau_{BM,p} \\ \tau_{AM,p} \\ \tau_{BK,p} \\ \tau_{SWG,p} \end{bmatrix}$$

As the initial value $x_0$, the angle $\theta_{(BM, AM, BK)}$ of the front work device 101 detected by the posture detector 125 to 128, the angular velocity $\omega_{(BM, AM, BK)}$, the swing angular velocity $\omega_{SWG}$, and the swing angle $\theta_{SWG}$ (azimuth) detected by the self-position calculator 133 are used. These pieces of information are available via the excavator controller 10. The control input $u_p$ is a group of driving torques $\tau_p$ for the hydraulic actuators 104, 110, 111, and 112. How to determine the control input $u_p$ (each driving torque $\tau_p$) will be described later. Note that Formula (3) is a notation of a continuous time system, but may be a notation of a discrete time system. The output $x_p$ and the control input $u_p$ of Formula (3) are determined for each time (prediction step) at which the prediction time section (times $t_0$ to $t_p$) is divided into a plurality of sections.

The entry determination unit 52 determines whether or not the calculation result of the trajectory prediction of the front work device 101 by the trajectory prediction unit 51 indicates that the front work device enters the prohibited area set by the prohibited area setting unit 44. Note that the entry determination unit 52 can also be configured to have a prediction calculation function of predicting the movement (position information) of the dump truck 200, similarly to the prediction calculation of the trajectory prediction unit 51.

The first control input calculation unit 53 calculates the control input by focusing on the trajectory of the pawl tip position of the bucket 108 (the distal end of the front work device 101) in the trajectory prediction of the front work device 101 by the trajectory prediction unit 51. That is, the driving torque $\tau$ is calculated such that the pawl tip position approaches the target position $y_d$ set by the target position setting unit 43 after the elapse of the prediction time section (time $t_0$ to $t_p$). Specifically, the control input $u_d$ that realizes $x_d$ in which the pawl tip position y becomes the target position $y_d$ is calculated according to Formula (4) that is a conversion formula from the trajectory of the front work device 101 to the pawl tip position y of the bucket 108 (the position of the distal end of the front work device 101) and Formula (5) for calculating the trajectory of the front work device 101. The control input $u_d$ is a collection of ideal driving torques $\tau_d$ for the hydraulic actuators 104, 110, 111, and 112 of the excavator 100.

[Mathematical Formula 4]

$$y = h(x) \qquad \text{Formula (4)}$$

$$y_d = h(x_d) \text{ when } t = t_p$$

[Mathematical Formula 5]

$$x_d = \int_{t_0}^{t_p} f(x_0, u_d) dt \qquad \text{Formula (5)}$$

$$u_d = \begin{bmatrix} \tau_{BM,d} \\ \tau_{AM,d} \\ \tau_{BK,d} \\ \tau_{SWG,d} \end{bmatrix}$$

Note that the target position $y_d$ changes according to the position of the dump truck 200. Therefore, it should be noted that the target position $y_d$ is calculated by Formula (6) of the coordinate transformation depending on the position $x_{tr}$ of the dump truck 200.

[Mathematical Formula 6]

$$y_d = l(x_{tr}) \qquad \text{Formula (6)}$$

The second control input calculation unit 54 calculates a control input $u_a$ that avoids the pawl tip position of the bucket 108 from entering the prohibited area set by the prohibited area setting unit 44 in the prediction time section (times $t_0$ to $t_p$) in the trajectory of the front work device 101. The calculation method of the control input $u_a$ is similar to the calculation method of the control input $u_d$ of the first control input calculation unit 53, and Formulas (4) and (5) are used. However, the trajectory of the front work device 101 is not calculated based on the target position $y_d$ of the loading work of the bucket 108, but is calculated based on a position different from the target position $y_d$ outside the prohibited area.

Next, a specific operation flow of the control input calculation unit 50 will be described with reference to FIGS. 12A to 12D. FIGS. 12A to 12D are diagrams illustrating a calculation method of a control input calculation unit constituting a part of the first embodiment of the loading work support system of the present invention illustrated in FIG. 6, and are explanatory diagrams illustrating an example of first to fourth stages of the calculation.

Figure 12A:
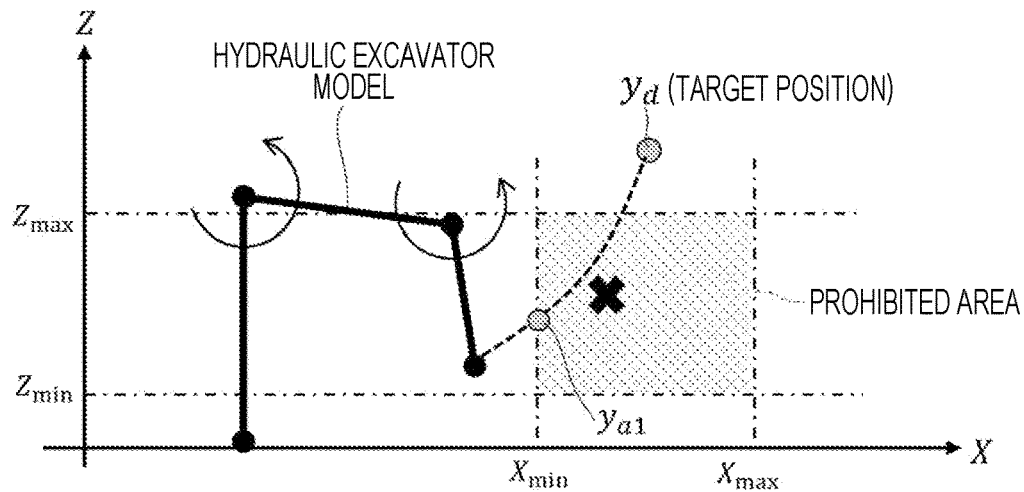
FIG. 12A is a diagram for describing a calculation method of an avoidance operation control input calculation unit constituting a part of the first embodiment of the loading work support system of the present invention illustrated in FIG. 6, and is an explanatory diagram illustrating an example of a first stage of the calculation.

FIG. 12A illustrates a calculation result (broken line) of the trajectory prediction for causing the pawl tip position of the bucket 108 to reach the target position $y_d$. The calculation result of the trajectory prediction indicates that the front work device has entered the prohibited area set by the prohibited area setting unit 44. The first coordinate at which the calculation result of the trajectory prediction indicates that the front work device enters the prohibited area is set as a coordinate $y_{a1}$.

Figure 12B:
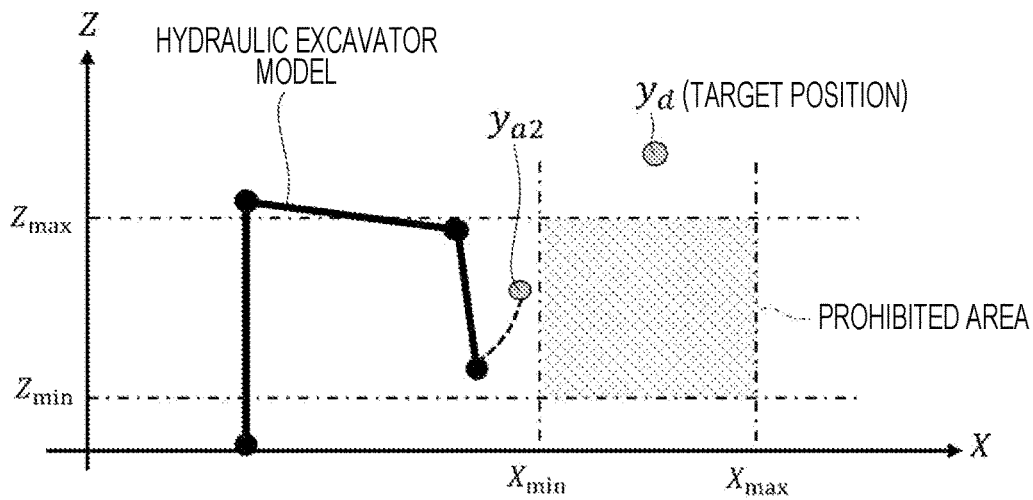
FIG. 12B is a diagram for describing a calculation method of an avoidance operation control input calculation unit constituting a part of the first embodiment of the loading work support system of the present invention illustrated in FIG. 6, and is an explanatory diagram illustrating an example of a second stage of the calculation.

In this case, as illustrated in FIG. 12B, the second control input calculation unit 54 refers to a coordinate $y_{a1}$ which is an entry position into the prohibited area, and sets a new coordinate $y_{a2}$ which is outside the prohibited area and closer to the target position $y_d$ of earth and sand release (loading work) than the pawl tip position. By replacing the target position of the pawl tip position with the coordinate $y_{a2}$ from the target position $y_d$ of earth and sand release, it is possible to calculate the control input $u_a$ in which the pawl tip position approaches the coordinate $y_{a2}$ after the prediction time section (time $t_0$ to $t_p$). As a result, it is possible to realize control in which the pawl tip position of the bucket 108 does not reach the target position $y_d$ as the earth and sand release position, but the pawl tip position approaches the target position $y_d$ while avoiding entry into the prohibited area.

Figure 12C:
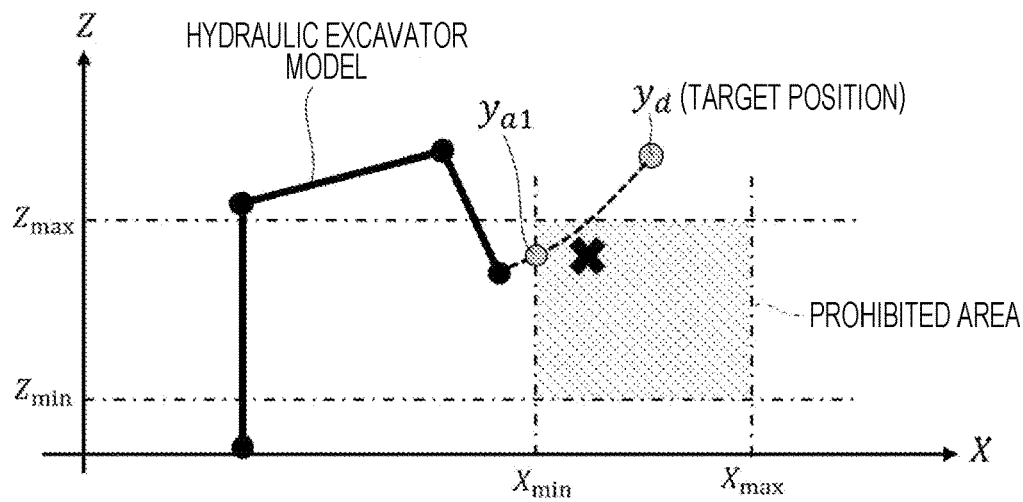
FIG. 12C is a diagram for describing a calculation method of the avoidance trajectory calculating unit constituting a part of the first embodiment of the loading work support system of the present invention illustrated in FIG. 6, and is an explanatory diagram illustrating another example of the first stage of the calculation.
Figure 12D:
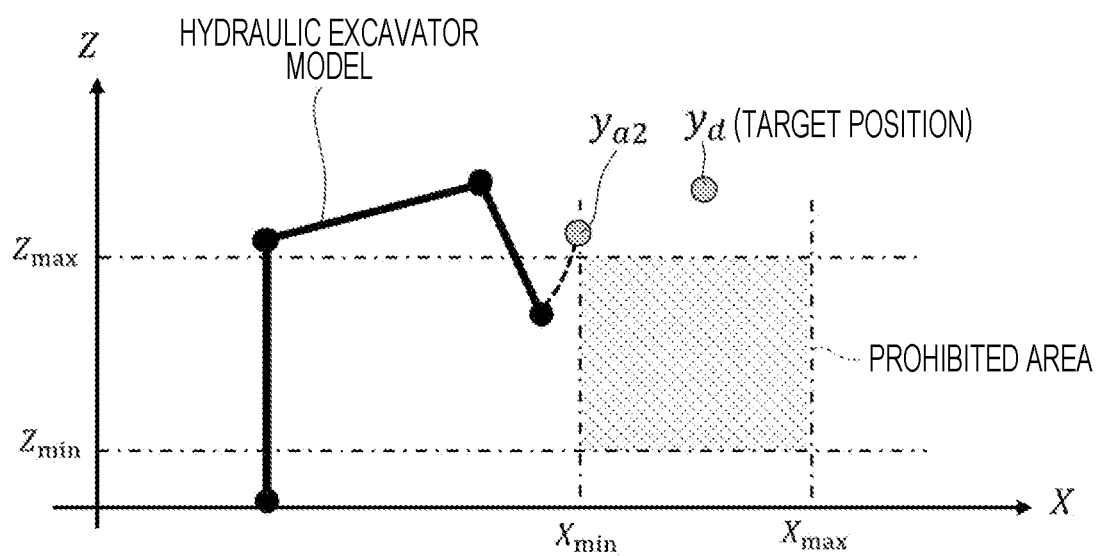
FIG. 12D is a diagram for describing a calculation method of the avoidance trajectory calculating unit constituting a part of the first embodiment of the loading work support system of the present invention illustrated in FIG. 6, and is an explanatory diagram illustrating another example of the second stage of the calculation.

Also in the next control cycle, as illustrated in FIG. 12C, similarly to the case illustrated in FIG. 12A, calculation of trajectory prediction for causing the pawl tip position of the bucket 108 to reach the target position $y_d$ is performed. When the calculation result of the trajectory prediction indicates that the front work device has entered the prohibited area, the second control input calculation unit 54 calculates the coordinate $y_{a1}$ that has entered the prohibited area. Next, as illustrated in FIG. 12D, similarly to the case illustrated in FIG. 12B, a new coordinate $y_{a2}$ that is outside the prohibited area and closer to the target position $y_d$ for earth and sand release than the pawl tip position is calculated with reference to the coordinate $y_{a1}$.

As described above, when the calculation result of the trajectory prediction for causing the pawl tip position of the bucket 108 to reach the target position $y_d$ indicates that the front work device enters the prohibited area, the second control input calculation unit 54 repeatedly performs the calculation of the trajectory prediction with the new coordinate $y_{a2}$ in the vicinity of the coordinate $y_{a1}$ that has entered the prohibited area as a target, so that the pawl tip position of the bucket 108 can be adjusted to the target position $y_d$ of earth and sand release without entering the prohibited area.

The second control input calculation unit 54 can also be configured to consider the trajectory of an arbitrary portion other than the pawl tip of the front work device 101. However, considering the entry of the front work device 101 into the prohibited area at a plurality of positions, there is a concern that the calculation load of the second control input calculation unit 54 becomes enormous. Therefore, by setting the prohibited area to be wide by the prohibited area setting unit 44, it is also possible to perform control such that only the pawl tip position of the bucket 108 does not enter the prohibited area.

The control input determination unit 55 determines a control input $u_f$ over the entire prediction time section (times $t_0$ to $t_p$) on the basis of a control input $u_d$ that is a calculation result from the first control input calculation unit 53 or a control input $u_a$ that is a calculation result from the second control input calculation unit 54 at each time (prediction step) at which the prediction time section (times $t_0$ to $t_p$) is divided into a plurality of sections. The control input determination unit 55 sequentially stores the control inputs calculated in each prediction step, and outputs a series of stored control inputs to the trajectory prediction unit 51 for calculation of trajectory prediction of the trajectory prediction unit 51. Since the control input $u_f$ is configured by the calculation result from the first control input calculation unit 53 and the calculation result from the second control input calculation unit 54, the control input $u_f$ is a control input such that the pawl tip of the bucket 108 approaches the target position within a range in which the pawl tip does not enter the prohibited area. The control input $u_f$ is a driving torque $\tau_f$ applied to each link of the front work device 101. The control input determination unit 55 transmits the determined driving torque $\tau_f$ to the excavator control unit 61 (excavator controller 10).

The excavator control unit 61 calculates a command value for realizing the control input $u_f$ (driving torque $\tau_f$) transmitted from the control input determination unit 55. Specifically, the driving torque $\tau_f$ of each of the hydraulic actuators 104, 110, 111, and 112 of the excavator 100 is converted into the pressure p of each of the hydraulic actuators 104, 110, 111, and 112 according to the relational expression of Formula (2). The excavator control unit 61 controls each control valve of the hydraulic pump device 122 and the control valve unit 123 such that the pressure of each of the hydraulic actuators 104, 110, 111, and 112 becomes a command value, thereby realizing the above-described driving torque $\tau_f$.

Note that the block diagram of FIG. 6 illustrating the functional units of the support system control unit 40 prioritizes ease of understanding. However, in practice, the calculation of the control input calculation unit 50 of the support system control unit 40 is configured to be repeatedly calculated. That is, the control input calculation unit 50 determines a control input for each time (prediction step) of a plurality of times in a certain finite prediction time section by repetitive calculation using trajectory prediction of the prediction time section.

Figure 13:
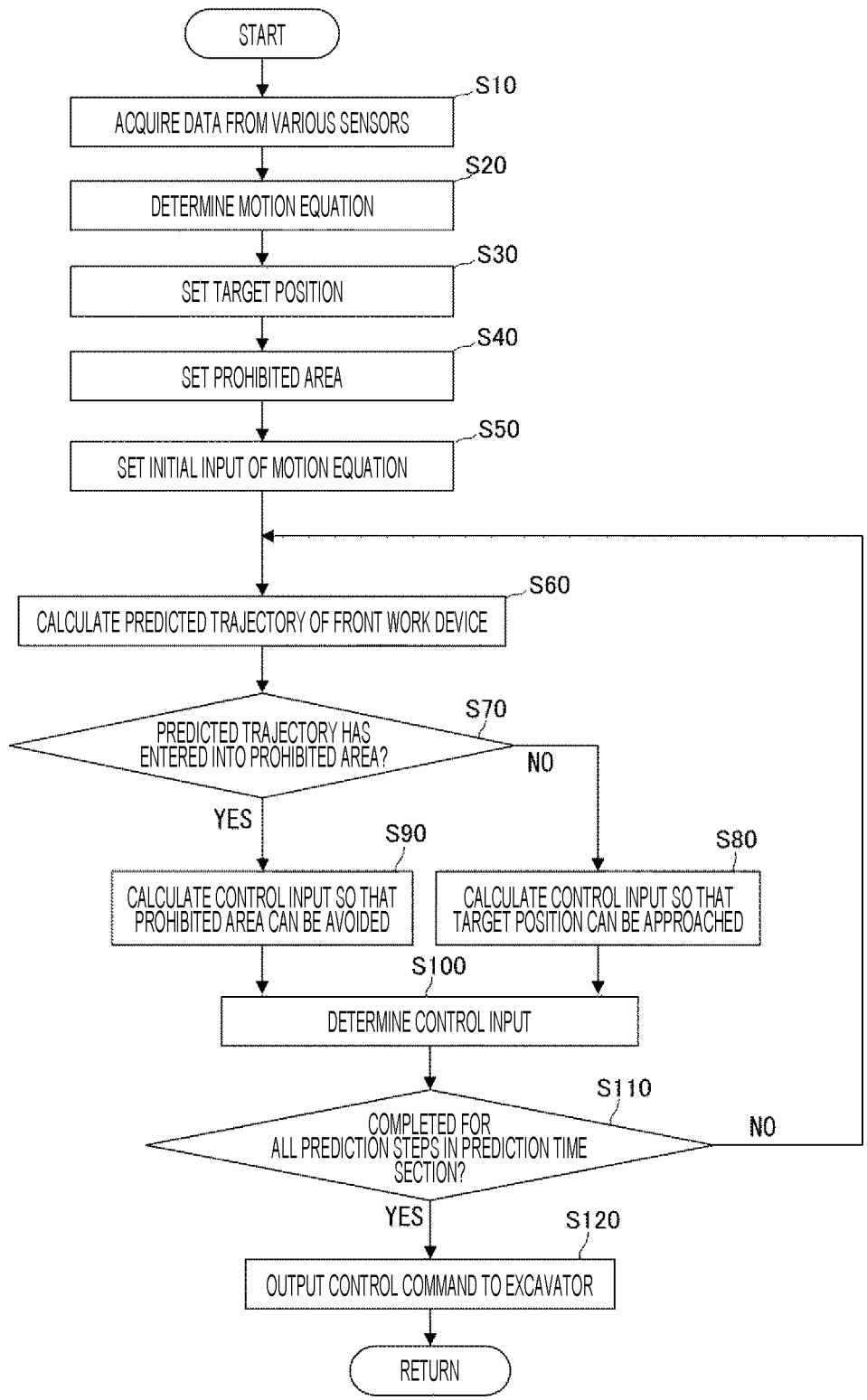
FIG. 13 is a flowchart illustrating an example of a processing procedure in the first embodiment of the loading work support system of the present invention illustrated in FIG. 6.

Here, details of the calculation procedure of the control input calculation unit 50 will be described with reference to FIG. 13. FIG. 13 is a flowchart illustrating an example of a processing procedure in the first embodiment of the loading work support system of the present invention illustrated in FIG. 6. It should be noted that the flowchart illustrated in FIG. 13 illustrates one operation of the control cycle, and the operation illustrated in FIG. 13 is repeated throughout the system operation.

First, the support system control unit 40 illustrated in FIG. 6 acquires various types of information from various sensors (step S10). Specifically, posture information of the excavator 100 is acquired from the posture detectors 125 to 128 of the excavator 100, position and azimuth information of the excavator 100 is acquired from the self-position calculator 133, and load information of the front work device 101 is acquired from the load detector 129. In addition, information on the position and azimuth of the dump truck 200 is acquired from the self-position calculator 212 of the dump truck 200.

Next, the support system control unit 40 determines dynamic characteristics (motion equation) based on the outputs of various sensors (step S20). Specifically, the dynamic characteristics calculation unit 42 calculates the moment of inertia I of the front work device 101 based on the posture of the front work device 101 and the weight $m_{BK}$ of the earth and sand in the bucket 108 calculated by the load calculation unit 41, and determines the motion equation of Formula (1).

In addition, the support system control unit 40 sets a target position which is a final arrival point (earth and sand release position) of the loading work at the pawl tip of the bucket 108 (step S30). Specifically, the target position setting unit 43 sets a target position for earth and sand release on the basis of the position $x_{tr}$ of the dump truck 200 from the self-position calculator 212 (see, for example, FIG. 8).

In addition, the support system control unit 40 sets a prohibited area which is an area where entry of the front work device 101 is prohibited (step S40). Specifically, the prohibited area setting unit 44 sets a prohibited area surrounding the periphery of the dump truck 200 on the basis of the position $x_{tr}$ of the dump truck 200 from the self-position calculator 212 (see, for example, FIGS. 9A to 11). Note that the order of the processing in steps S20 to S40 is not limited.

Next, the support system control unit 40 sets an initial input of calculation of trajectory prediction executed in step S60 to be described later (step S50). Specifically, the trajectory prediction unit 51 sets an initial state $x_0$ of the front work device 101 determined on the basis of various pieces of information acquired from various sensors as an initial input of the motion equation determined in step S20. In addition, the trajectory prediction unit 51 sets an arbitrary control input $u_0$ as an initial input of the control input $u_p$ of the motion equation determined in step S20.

Next, the support system control unit 40 performs calculation to predict the trajectory of the front work device 101 in the finite prediction time section (step S60). Specifically, the trajectory prediction unit 51 performs calculation using Formula (3) with the control input $u_p$ as the initial input $u_0$. Since this calculation includes an integration calculation of the prediction time section (time $t_0$ to time $t_p$), the control input $u_p$ is necessary for each time (each prediction step) of a plurality of times (for example, $t_0, t_1, t_2, \ldots, t_k=t_p$) in the prediction time section.

The support system control unit 40 determines whether or not the calculation result of the predicted trajectory calculated in step S60 indicates that the front work device has entered the prohibited area set in step S40 (step S70) The process proceeds to step S80 when the entry determination unit 52 determines that the front work device has not entered the prohibited area (NO), whereas the process proceeds to step S90 when the entry determination unit 52 determines that the front work device has entered the prohibited area (YES).

If NO is obtained in step S70, the support system control unit 40 calculates a control input $u_d$ such that the pawl tip position of the bucket 108 approaches the target position $y_d$ for earth and sand release (step S80). Specifically, the first control input calculation unit 53 calculates a control input $u_d$ that realizes $x_d$ in which the pawl tip position y reaches the target position $y_d$ for earth and sand release using Formulas (4) to (6) on the basis of the calculation result of the predicted trajectory.

On the other hand, when YES is obtained in step S70, the support system control unit 40 calculates the control input $u_a$ that avoids the pawl tip position of the bucket 108 from entering the prohibited area (step S90). Specifically, the second control input calculation unit 54 calculates the control input $u_a$ using a calculation method similar to that of the first control input calculation unit 53. However, instead of setting the arrival position after the elapse of the prediction time section of the pawl tip position y as the target position $y_d$ for earth and sand release, a certain position $y_{a2}$ outside the prohibited area in the vicinity of the position where the calculation result of the prediction trajectory indicates that the front work device enters the prohibited area is set as the target position (see FIGS. 12A to 12D).

The support system control unit 40 determines the control input $u_d$ or the control input $u_a$ calculated according to the determination in step S70 as the control input $u_f$ used in the actual control (step S100), and stores the control input $u_f$ in the storage device 30a (see FIG. 5). However, the determined control input $u_f$ is a control input of one prediction step (for example, any one of times $t_0, t_1, t_2, \ldots,$ and $t_k$) in the prediction time section. That is, the operations in steps S60 to S100 determine the control input for one prediction step in the prediction time section. In the present embodiment, the control input calculation unit 50 repeatedly executes the calculations in steps S60 to S100 to determine the control input $u_f$ for all (all prediction steps) of the plurality of times in the prediction time section (see step S110 described later).

In step S100, the control input determination unit 55 sequentially stores, the control input $u_d$ or the control input $u_a$ calculated in each prediction step in the storage device 30a as the control input $u_f$ used in the actual control, and finally stores the control input $u_f$ for all the prediction steps in the prediction time section. For example, in a case where k+1 prediction steps at times $t_0, t_1, t_2, \ldots,$ and $t_k$ are performed for the prediction time section, the control input determination unit 55 stores a vector sequence of $U=[u_f[t_0], u_f[t_1], \ldots, u_f[t_k]]$.

After the control input of each prediction step is determined in step S100, the support system control unit 40 determines whether or not the calculation of all the prediction steps in the prediction time section has ended (step S110). Specifically, the control input determination unit 55 determines whether all the elements $u_f[t]$ of the vector sequence U are stored. When all the elements $u_f[t]$ of the vector sequence U are not stored, it is determined that all the prediction steps are not completed (NO). On the other hand, when all the elements $u_f[t]$ are stored, it is determined that all the prediction steps are completed (YES).

When NO is obtained in step S110, the operations in steps S60 to S100 are repeatedly executed. However, in the second and subsequent operations in step S60, an element $u_f[t]$ stored in the vector sequence U of the control input determined in the previous operation loop is used as the control input $u_p$ used for the trajectory prediction instead of the initial input $u_0$ set in step S50.

If YES is obtained in step S110, the support system control unit 40 converts the vector sequence U of the control input determined in step S100 into a control command, and outputs the converted control command to the excavator 100 (step S120). Specifically, the excavator control unit 61 converts the vector sequence U of the control input $u_f$ determined in step S100 into the pressure p according to the relationship of Formula (2). As a result, the hydraulic pump device 122 of the excavator 100 and each control valve of the control valve unit 123 are controlled according to each control command, and the front work device 101 can load earth and sand on the loading table 202 without contacting the dump truck 200.

As described above, in the present embodiment, it is determined whether or not the predicted trajectory of the front work device 101 enters the prohibited area. When it is determined that the predicted trajectory enters the prohibited area, the control input that enables the trajectory of the front work device 101 that does not enter the prohibited area is calculated by setting, as a target, a position outside the prohibited range different from the target position $y_d$ for earth and sand release set by the target position setting unit 43. Therefore, the front work device 101 can perform the loading work reliably without contacting the dump truck 200.

Note that the operation of the control input calculation unit 50 described above can be executed in the framework of model predictive control (MPC) The MPC is a control method of predicting a behavior of a specific time ahead using dynamic characteristics (for example, the motion equation) of a control target and calculating a control input so as to minimize a specific evaluation function (for details, see Introduction to Nonlinear Optimal Control, Toshiyuki Otsuka, Corona Publishing Co., Ltd. (2011)).

Figure 14A:
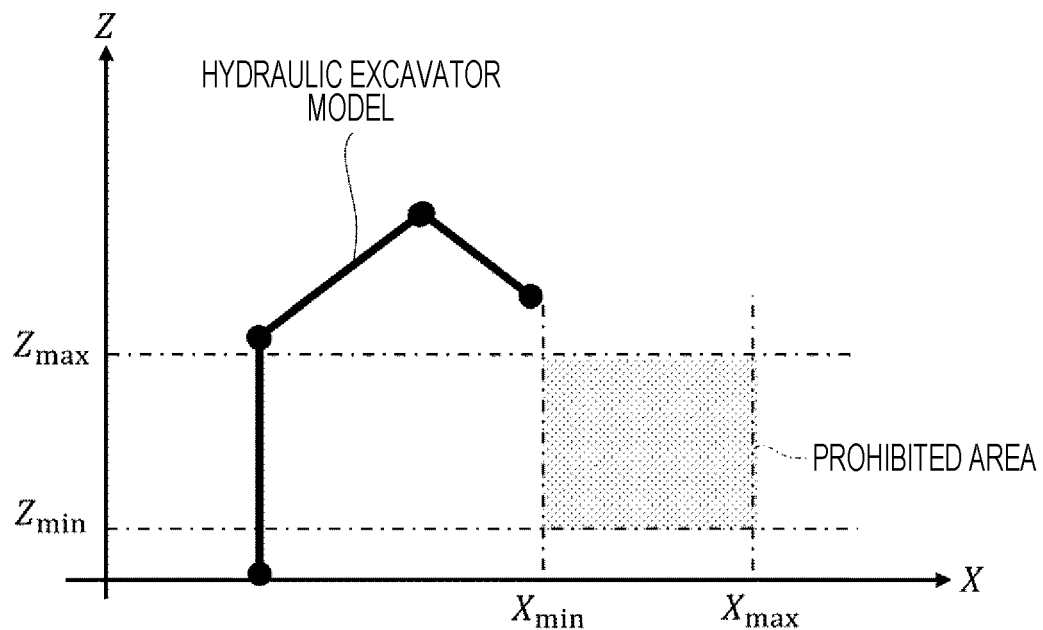
FIG. 14A is a schematic diagram illustrating an example of a positional relationship between an excavator and a prohibited area in a case where a framework of calculation of model predictive control is used in the first embodiment of the loading work support system of the present invention.
Figure 14B:
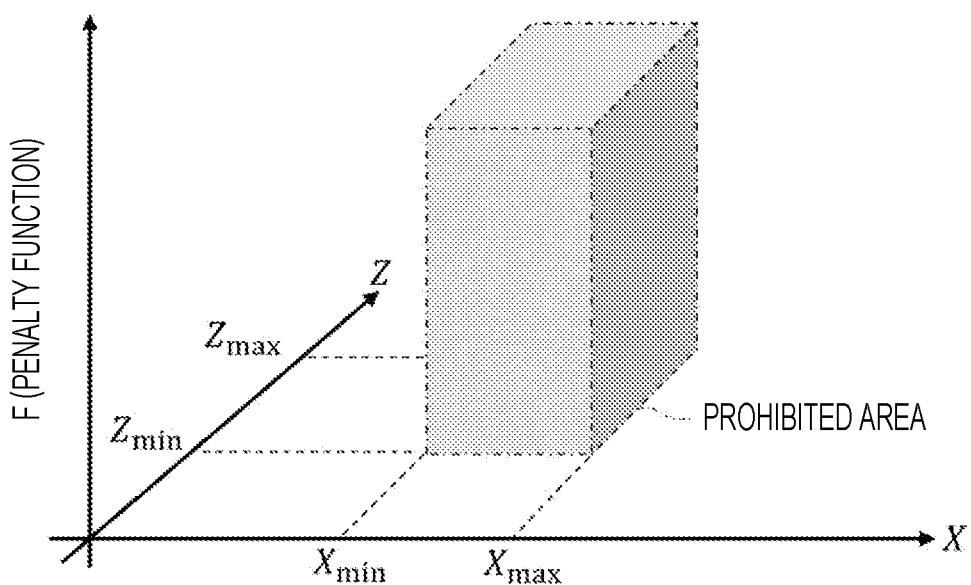
FIG. 14B is a diagram for describing a penalty function in the case of using a calculation framework of model predictive control in the first embodiment of the loading work support system of the present invention.

The calculation of the MPC in the present embodiment will be described with reference to FIGS. 14A and 14B. FIG. 14A is a schematic diagram illustrating an example of a positional relationship between the excavator and the prohibited area in a case where a frame of calculation of model predictive control is used in the first embodiment of the loading work support system of the present invention. FIG. 14B is a diagram for describing a penalty function in the case of using a frame of calculation of model predictive control in the first embodiment of the loading work support system of the present invention.

The iterative calculation of the trajectory prediction unit 51 to the control input determination unit 55, that is, the calculation of the control input calculation unit 50 is equivalent to designing the evaluation function in the MPC as Formula (7). By calculating the control input u that minimizes the evaluation function J of Formula (7), it is possible to control the excavator 100 so that the front work device 101 does not enter the prohibited area.

[Mathematical Formula 7]

$$J = \varphi(x(t_p)) + \int_{t_0}^{t_p} \{L(x(t)) + P(x(t))\}dt \quad \text{Formula (7)}$$

$$\varphi(x(t_p)) = \frac{1}{2}(h(x(t_p)) - y_d)^T S(h(x(t_p)) - y_d) \quad \text{Formula (7a)}$$

$$L(x(t)) = \frac{1}{2}(h(x(t)) - y_d)^T Q(h(x(t)) - y_d) \quad \text{Formula (7b)}$$

$$P(x(t)) = F(h(x(t))) \quad \text{Formula (7c)}$$

Formula (7) is configured using Formula (7a), Formula (7b), and Formula (7c). Formula (7a) represents the terminal cost, and Formula (7b) represents the stage cost. Formula (7c) represents a penalty cost as a constraint condition. Note that h(x) in the equation is Formula (4) that is a conversion equation for converting the trajectory of the front work device 101 to the pawl tip position of the bucket 108. In addition, $y_d$ is a target position for earth and sand release set by the target position setting unit 43 described above.

It can be seen that both Formulas (7a) and (7b) are functions whose values decrease as the pawl tip position h(x(t)) at time t is closer to the target position $y_d$. The evaluation function J includes an integration operation from time $t_0$ to time $t_p$, which is a prediction time section, and can be said to be an operation for executing a calculation of trajectory prediction of the front work device 101. That is, it can be said that the optimization (minimization) of Formulas (7a) and (7b) executes the calculation functions of the trajectory prediction unit 51 and the first control input calculation unit 53.

The penalty cost of Formula (7c) is defined by a penalty function F. The penalty function F is a function that outputs a large value only when the pawl tip position h(x(t)) enters the prohibited area, and outputs 0 when the pawl tip position h(x(t)) is outside the range of the prohibited area. Hereinafter, characteristics of the penalty function F will be described. In order to simplify the description, as illustrated in FIG. 14A, only an area of a side surface (x-z plane in FIG. 14A) of a dump truck is considered as a range of a pawl tip position of the excavator.

Only when the x coordinate of the pawl tip position is within the range from $x_{min}$ to $x_{max}$ and the z coordinate is within the range from $z_{min}$ to $z_{max}$, that is, when the pawl tip position is within the range of the prohibited area, the penalty function F outputs a large value as illustrated in FIG. 14B. In a case where such a penalty function F is included in the evaluation function J, when the predicted trajectory of the pawl tip position enters the prohibited area, the value of the evaluation function J rapidly increases. Therefore, a solution in which the penalty function F outputs a large value due to the process of optimizing the evaluation function J is excluded. That is, the control input in which the pawl tip position naturally avoids the prohibited area is calculated. It can be said that this calculation is executed by the entry determination unit 52 and the second control input calculation unit 54.

As described above, the evaluation function J includes the termination cost and the stage cost for bringing the pawl tip position of the bucket 108 close to the target position $y_d$, and the penalty function F for moving the pawl tip position away from the prohibited area. Therefore, it can be said that the evaluation function J is equivalent to the control input determination unit 55 that determines the final control input $u_f$ using the calculation result $u_p$ from the first control input calculation unit 53 and the calculation result $u_a$ from the second control input calculation unit 54.

In the evaluation function J of Formula (7) described above, the term related to the control input u is not explicitly included, and the trajectory of the front work device 101 is related to the control input u via Formula (3) described above. However, the evaluation function J can also be configured to introduce evaluation related to the control input u by setting the evaluation function J as in Formula (8). In this case, by introducing the term of the control input u as in Formula (8), it is possible to prevent the control input from being excessive.

[Mathematical Formula 8]

$$J = \varphi(x(t_p)) + \int_{t_0}^{t_p} \{L(x(t)) + P(x(t)) + u(t)Ru(r)^t\}dt\ldots \quad \text{Formula (8)}$$

As described above, the loading work support system 1 according to the first embodiment of the present invention supports the loading work in which the excavator 100 (loader) including the articulated front work device 101 (work device) configured by rotatably connecting the plurality of driven members 106, 107, and 108 loads a cargo onto the dump truck 200 (transporter) including the loading table 2, and includes the first position calculator 133 that calculates the position and azimuth of the excavator 100 (loader), the posture detectors 125 to 128 that detects the azimuth of the front work device 101 (work device), the second position calculator 212 that calculates the position and azimuth of the dump truck 200 (transporter), and the support system control unit 40 (control device configured by excavator controller 10, truck controller 20, and control controller 30) that controls the operation of the excavator 100 (loader). The support system control unit 40 (control device) sets a target position $y_d$, which is a position to be reached by the front work device 101 (work device) in the loading work, based on the output of the second position calculator 212, sets a prohibited area, which is an area where entry of the front work device 101 (work device) is prohibited, based on the output of the second position calculator 212, performs prediction calculation to predict the trajectory of the front work device 101 (work device) in a finite prediction time section (time $t_0$ to time $t_p$) using the output of the first position calculator 133, the output of the posture detector 125 to 128, and the dynamic characteristics of the front work device 101 (work device), determines whether the front work device 101 (work device) enters the prohibited area in the prediction time section (time $t_0$ to time $t_p$) based on the calculation result of the trajectory prediction of the front work device 101 (work device), when it is determined that the front work device 101 (work device) does not enter the prohibited, area, calculates the first input $u_p$, which is the input of the dynamic characteristics of the front work device 101 (work device) such that the pawl tip (distal end) of the bucket 108 of the front work device 101 (work device) approaches the target position $y_d$ in the prediction time section (time $t_0$ to time $t_p$) based on the calculation result of the trajectory prediction of the front work device 101 (work device), when it is determined that the front work device 101 (work device) enters the prohibited area, calculates a second input $u_a$ that is an input of dynamic characteristics of the front work device 101 (work device) such that the distal end of the front work device 101 (work device) approaches a position different from the target position $y_d$ outside the prohibited area and closer to the target position $y_d$ than the position of the pawl tip (distal end) of the bucket 108 of the front work device 101 (work device) in the prediction time section (time $t_0$ to time $t_p$), calculates a control input for controlling the operation of the excavator 100 (loader) based on the calculated first input $u_p$ and second input $u_a$ of dynamic characteristics of the front work device 101 (work device), and controls the excavator 100 (loader) based on the calculated control input.

According to this configuration, by using the control input of the excavator 100 (loader) calculated under the constraint condition that the pawl tip (distal end) of the bucket 108 of the front work device 101 (work device) does not enter the prohibited area on the basis of the calculation result of the trajectory prediction of the front work device 101 (work device) using the dynamic characteristics of the front work device 101 (work device) of the excavator 100 (loader), the operation of the excavator 100 (loader) can be controlled such that the pawl tip (distal end) of the bucket 108 of the front work device 101 (work device) approaches the target position $y_d$ of the loading work while avoiding the prohibited area. Therefore, it is possible to reliably support the loading work regardless of the positional relationship between the excavator 100 (loader) and the dump truck 200 (transporter).

The loading work support system 1 according to the present embodiment further includes the load detector 129 that detects the load of the front work device 101 (work device). The support system control unit 40 (control device) is further configured to calculate the load of the cargo held by the front work device 101 (work device) on the basis of the output of the load detector 129 and the output of the posture detector 125 to 128, and adjust the dynamic characteristics of the front work device 101 (work device) on the basis of the calculated load of the cargo and the output of the posture detector 125 to 128.

According to this configuration, since the dynamic characteristics of the front work device 101 (work device) are adjusted according to the state of the loading work at the time of the prediction calculation, the trajectory prediction of the front work device 101 (work device) can be performed with higher accuracy.

In addition, in the loading work support system 1 according to the present embodiment, the support system control unit 40 (control device) is configured to set the prohibited area so as to surround the periphery of the dump truck 200 and to make the periphery of the cab 205 wider than the periphery of the loading table 202. According to this configuration, it is possible to avoid selection of the path of the front work device 101 that gives anxiety to the operator riding in the cab 205 of the dump truck 200.

In addition, the support system control unit 40 (control device) of the loading work support system 1 according to the present embodiment is configured to set the prohibited area to be wider when the dump truck 200 is moving than when the dump truck 200 is stopped on the traveling direction side of the dump truck 200. According to this configuration, even when the dump truck 200 approaches the excavator 100, the possibility of contact between the front work device 101 and the dump truck 200 can be further reduced, so that the safety of the loading work can be enhanced.

In addition, the support system control unit 40 (control device) of the loading work support system 1 according to the present embodiment is configured to set the target position to a different position with respect to the loading table 202 of the dump truck 200 for each loading work of the excavator 100 in a case where the excavator 100 performs the loading work a plurality of times before the dump truck 200 transports the cargo. According to this configuration, since the cargo can be loaded on the entire loading table 202, the number of times of transport of the cargo can be reduced and efficient transport can be performed.

In addition, the support system control unit 40 (control device) of the loading work support system 1 according to the present embodiment is configured to execute a series of processes of calculation of trajectory prediction of the front work device 101 (work device), determination of presence or absence of entry of the front work device 101 (work device) into the prohibited area, calculation of a first input of dynamic characteristics of the front work device 101 (work device), and calculation of a second input of dynamic characteristics of the front work device 101 (work device) using the evaluation function J of model predictive control.

According to this configuration, the control of the operation of the excavator 100 (loader) can be realized by mounting the algorithm of the evaluation function J in the support system control unit 40 (control device).

In addition, in the support system control unit 40 (control device) of the loading work support system 1 according to the present embodiment, the evaluation function J is configured to include the penalty function F that increases the value of the evaluation function J when the front work device 101 (work device) enters the prohibited area. According to this configuration, since the penalty function F functions as a constraint condition that the pawl tip (distal end) of the bucket 108 of the front work device 101 (work device) does not enter the prohibited area, it is possible to reliably control the operation of the excavator 100 (loader) such that the pawl tip (distal end) of the bucket 108 of the front work device 101 (work device) approaches the target position $y_d$ of the loading work while avoiding the prohibited area.

Modification of First Embodiment

Figure 15:
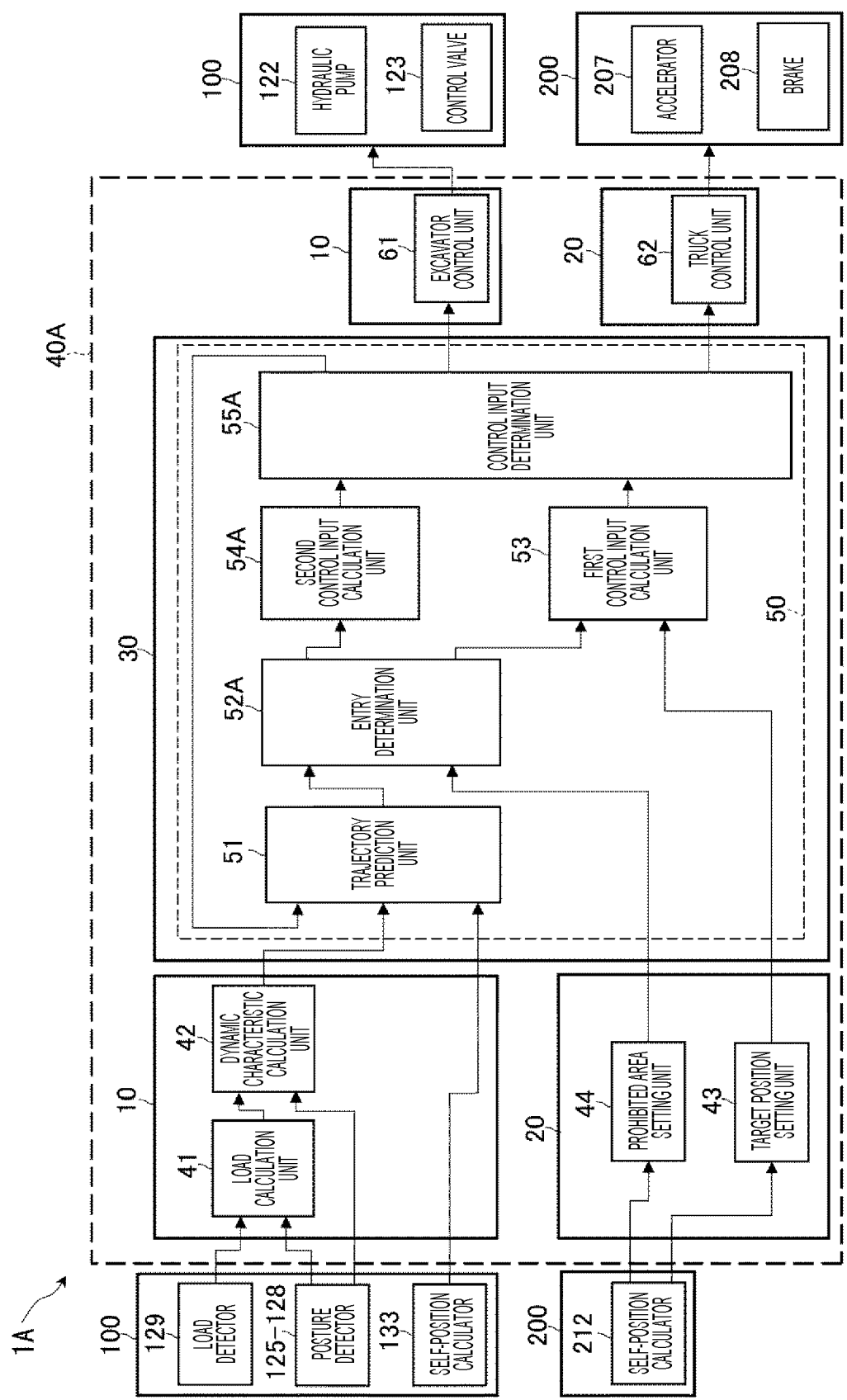
FIG. 15 is a block diagram illustrating a functional configuration of a modification of the first embodiment of the loading work support system of the present invention.

Next, a modification of the first embodiment of the loading work support system of the present invention will be described with reference to FIG. 15. FIG. 15 is a block diagram illustrating a functional configuration of a modification of the first embodiment of the loading work support system of the present invention. Note that, in FIG. 15, components having the same reference numerals as those illustrated in FIGS. 1 to 13 are similar parts, and thus a detailed description thereof will be omitted.

In the first embodiment, the contact between the excavator 100 and the dump truck 200 during the loading work is avoided by controlling only the operation of the excavator 100, whereas in the modification of the first embodiment of the loading work support system of the present invention, the contact between the excavator and the dump truck during the loading work is avoided by controlling both the operations of the excavator 100 and the dump truck 200. In order to avoid contact between the excavator 100 and the dump truck 200 at the time of loading work, it is advantageous to control both.

For example, when the dump truck 200 approaches the excavator 100, it is easy to avoid contact between the dump truck 200 and the excavator by causing the dump truck to approach at a sufficiently low speed. In addition, assuming a case where the control operation for avoiding contact of the excavator 100 exceeds the operation limit of the front work device 101, it is conceivable to avoid contact between the two by causing the dump truck 200 by executing an operation of separating from the excavator 100. A loading work support system 1A of the present modification implements such an operation.

Specifically, a support system control unit 40A of the loading work support system 1A includes a truck control unit 62 in addition to the functional units 41 to 44, 50, and 61 of the first embodiment. The truck control unit 62 controls forward/backward movement and speed of the dump truck 200 by interfering with the accelerator 207 and the brake 208 of the dump truck 200. The truck control unit 62 is mounted on the truck controller 20, for example.

In addition, in the control input calculation unit 50 of the present modification, the calculation of the entry determination unit 52A, the second control input calculation unit 54A, and the control input determination unit 55A is different from the calculation of the functional units 52, 54, and 55 of the first embodiment, and is changed to calculation contents in consideration of control of the dump truck 200.

Specifically, the entry determination unit 52A determines whether the front work device 101 has entered the prohibited area in consideration of dynamic characteristics (for example, the motion equation) of the dump truck 200. The motion equation of the dump truck 200 is given by, for example, Formula (9). The entry determination unit 52A predicts a position change (movement) of a prohibited area in a prediction time section (the same section as the prediction time section of the excavator) from time $t_0$ to time $t_p$ on the basis of Formula (9). That is, an integration operation similar to Formula (3) is performed.

[Mathematical Formula 9]

$$\dot{x}_{tr} = k(x_{tr}, v) \quad \text{Formula (9)}$$

$$x_{tr} = \begin{bmatrix} xt \\ yt \\ \theta t \end{bmatrix},$$

$$v = \begin{bmatrix} a \\ b \end{bmatrix}$$

Note that xt and yt are positions of the GNSS antenna of the dump truck in planar coordinates, and θt is an azimuth angle of the dump truck 200. The control input v is given by a control amount a of the accelerator and a control amount b of the brake.

The second control input calculation unit 54A calculates both the control input u of the excavator 100 and the control input v of the dump truck 200 such that the calculation result of the trajectory prediction of the front work device 101 indicates that the front work device does not enter the prohibited area set around the dump truck 200. Note that, since it is preferable to control the operation of the dump truck 200 in order to smoothly operate the front work device 101, it is possible to perform setting so as to calculate both control inputs so as to actively change the control input v of the dump truck 200 rather than the control input u of the excavator 100.

The control input determination unit 55A determines the control input u in the prediction time section of the excavator 100 and determines the control input v in the prediction time section of the dump truck 200 on the basis of the calculation result from the first control input calculation unit 53 and the calculation result from the second control input calculation unit 54A. The control input determination unit 55A transmits the control input u of the excavator 100 to the excavator control unit 61, and transmits the control input v of the dump truck 200 to the truck control unit 62.

As described above, in the present modification, the position change of the prohibited area is predicted using the dynamic characteristics of the dump truck 200, it is determined whether or not the predicted trajectory of the front work device 101 enters the prohibited area, and the control input u of the excavator 100 and the control input v of the dump truck 200 that enable the trajectory of the front work device 101 that does not enter the predicted prohibited area are calculated. Therefore, since both the operation of the excavator 100 and the operation of the dump truck 200 can be controlled as the operation for avoiding the contact between the front work device 101 and the dump truck 200, the range of the avoidance operation is widened.

Note that the calculation of the control input calculation unit 50 in the present modification can also be realized by the framework of the MPC, similarly to the fact that the calculation of the control input calculation unit 50 of the first embodiment can be realized by the MPC. Specifically, in the evaluation function J of Formula (7), by using Formula (10) obtained by combining the dynamic characteristics of the excavator 100 and the dynamic characteristics of the dump truck 200 instead of the dynamic characteristics f of only the excavator 100 used to calculate the trajectory x of the front work device 101, it is possible to realize the calculation of both the control inputs of the excavator 100 and the dump truck 200 in the same framework as the case of the first embodiment.

[Mathematical Formula 10]

$$\dot{x}_{aug} = f_{aug}(x_{aug}, u_{aug}) \quad \text{Formula (10)}$$

$$x_{aug} = \begin{bmatrix} x \\ x_{tr} \end{bmatrix},$$

$$u_{aug} = \begin{bmatrix} u \\ v \end{bmatrix}$$

According to the modification of the first embodiment of the loading work support system of the present invention described above, similarly to the first embodiment described above, the operation of the excavator 100 (loader) can be controlled such that the pawl tip (distal end) of the bucket 108 of the front work device 101 (work device) avoids the prohibited area and approaches the target position $y_d$ of the loading work. Therefore, the loading work can be reliably supported regardless of the positional relationship between the excavator 100 (loader) and the dump truck 200 (transporter).

Furthermore, in the loading work support system 1A according to the present modification, the support system control unit 40A (control device) is configured to control the operation of the dump truck 200 (transporter) in addition to the operation of the excavator 100 (loader), and the support system control unit 40A (control device) further performs prediction calculation of predicting the movement of the dump truck 200 (transporter) in the prediction time section (time $t_0$ to time $t_p$) using the dynamic characteristics of the dump truck 200 (transporter). In addition, the determination of the presence or absence of the entry of the front work device 101 (work device) into the prohibited area by the support system control unit 40A (control device) is performed in consideration of the calculation result of the movement prediction of the dump truck 200 (transporter), and the calculation of the support system control unit 40A (control device) when it is determined that the front work device 101 (work device) enters the prohibited area is changed so as to calculate the second input of the dynamic characteristics of the front work device 101 (work device) and the second input of the dynamic characteristics of the dump truck 200 (transporter) such that the pawl tip (distal end) of the bucket 108 of the front work device 101 (work device) approaches a position different from the target position $y_d$ outside the prohibited area and closer to the target position $y_d$ than the position of the pawl tip (distal end) of the bucket 108 of the front work device 101 (work device) in the prediction time section (time $t_0$ to time $t_p$). Furthermore, the support system control unit 40A (control device) calculates a control input for controlling the operation of the dump truck 200 (transporter) on the basis of the calculated second input of the dynamic characteristics of the dump truck 200 (transporter), and controls the dump truck 200 (transporter) on the basis of the calculated control input.

According to this configuration, by controlling both the operation of the excavator 100 and the operation of the dump truck 200 as the operation of supporting the contact avoidance between the front work device 101 (work device) and the dump truck 200 (transporter), the range of the control operation of the contact avoidance is widened, so that the loading work can be more reliably supported.

Second Embodiment

Figure 16:
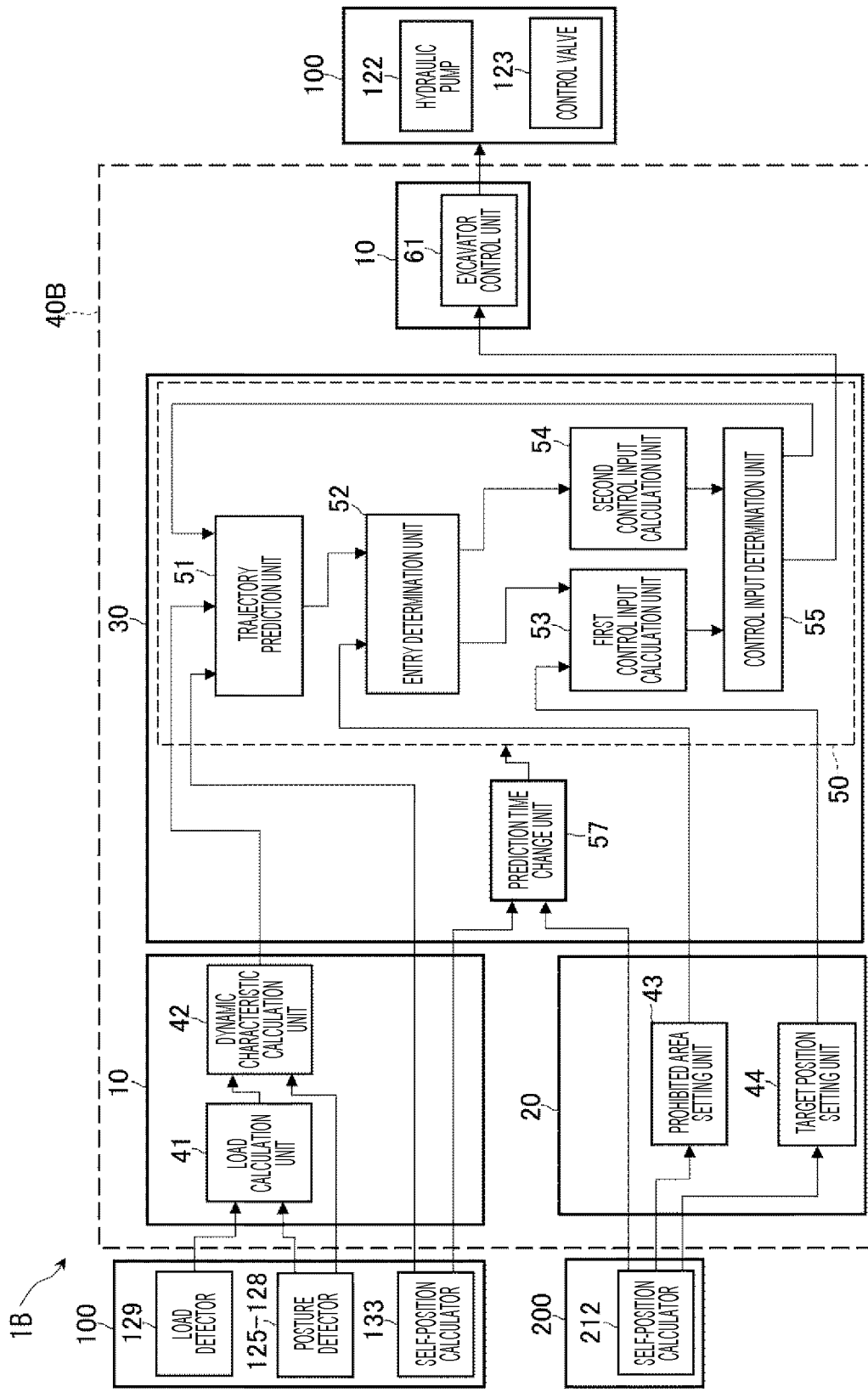
FIG. 16 is a block diagram illustrating a functional configuration of a second embodiment of the loading work support system of the present invention.

Next, a loading work support system according to a second embodiment of the present invention will be described with reference to FIG. 16. FIG. 16 is a block diagram illustrating a functional configuration of the second embodiment of the loading work support system of the present invention. Note that, in FIG. 16, components having the same reference numerals as those illustrated in FIGS. 1 to 15 are similar parts, and thus a detailed description thereof will be omitted.

In the first embodiment, the functional units 51 to 55 of the control input calculation unit 50 perform calculation using a constant prediction time section from time $t_0$ to time $t_p$, whereas a loading work support system 1B according to the second embodiment of the present invention illustrated in FIG. 16 can change the prediction time section in the calculation of the functional units 51 to 55 of the control input calculation unit 50.

For example, in a case where the dump truck 200 is located sufficiently away from the excavator 100, there is no possibility of collision between the excavator 100 and the dump truck 200 even if the prediction time section (integration section of calculation) is shortened. On the other hand, in a case where the relative approach speed between the excavator 100 and the dump truck 200 is high, the possibility of the collision between the excavator 100 and the dump truck 200 cannot be rejected in the prediction in the short prediction time section. In order to reliably avoid such a situation, it is necessary to appropriately adjust the prediction time section according to the mutual situation of the excavator 100 and the dump truck 200.

Therefore, a support system control unit 40B of the loading work support system 1B according to the present embodiment further includes a prediction time change unit 57 that changes the prediction time section (integration section) in each calculation of the functional units 51 to 55 of the control input calculation unit 50 in addition to the functional units 41 to 44, 50, and 61 of the first embodiment. The prediction time change unit 57 acquires information on the position and the moving speed (position update difference) from the self-position calculators 133 and 212 of the excavator 100 and the dump truck 200, respectively. The prediction time change unit 57 is configured to set the prediction time section longer than usual as the relative distance between the excavator 100 and the dump truck 200 calculated on the basis of the acquired various types of information is shortened and the approach speed of the dump truck 200 is faster. The prediction time change unit 57 appropriately sets the prediction time section according to the mutual situation of the excavator 100 and the dump truck 200, so that it is possible to reliably avoid contact between the excavator 100 and the dump truck 200.

According to the second embodiment of the loading work support system of the present invention described above, similarly to the first embodiment described above, since the operation of the excavator 100 (loader) can be controlled such that the pawl tip (distal end) of the bucket 108 of the front work device 101 (work device) approaches the target position $y_d$ of the loading work while avoiding the prohibited area, it is possible to reliably support the loading work regardless of the positional relationship between the excavator 100 (loader) and the dump truck 200 (transporter).

In addition, in the loading work support system 1B according to the present embodiment, the support system control unit 40B (control device) is configured to be able to change the length of the prediction time section. According to this configuration, it is possible to appropriately support the operation of the loading work by changing the length of the prediction time section according to the mutual situation of the excavator 100 (loader) and the dump truck 200 (transporter).

In addition, the support system control unit 40B (control device) of the loading work support system 1B according to the present embodiment is configured to change the length of the prediction time section to be longer as the relative approach speed of the dump truck 200 (transporter) with respect to the excavator 100 (loader) calculated based on the output of the first position calculator 133 and the output of the second position calculator 212 is faster. According to this configuration, when the possibility of the contact between the dump truck 200 (the transporter) and the excavator 100 (the loader) cannot be rejected, the prediction time section is lengthened, so that it is possible to appropriately support the operation of the loading work.

Third Embodiment

Figure 17:
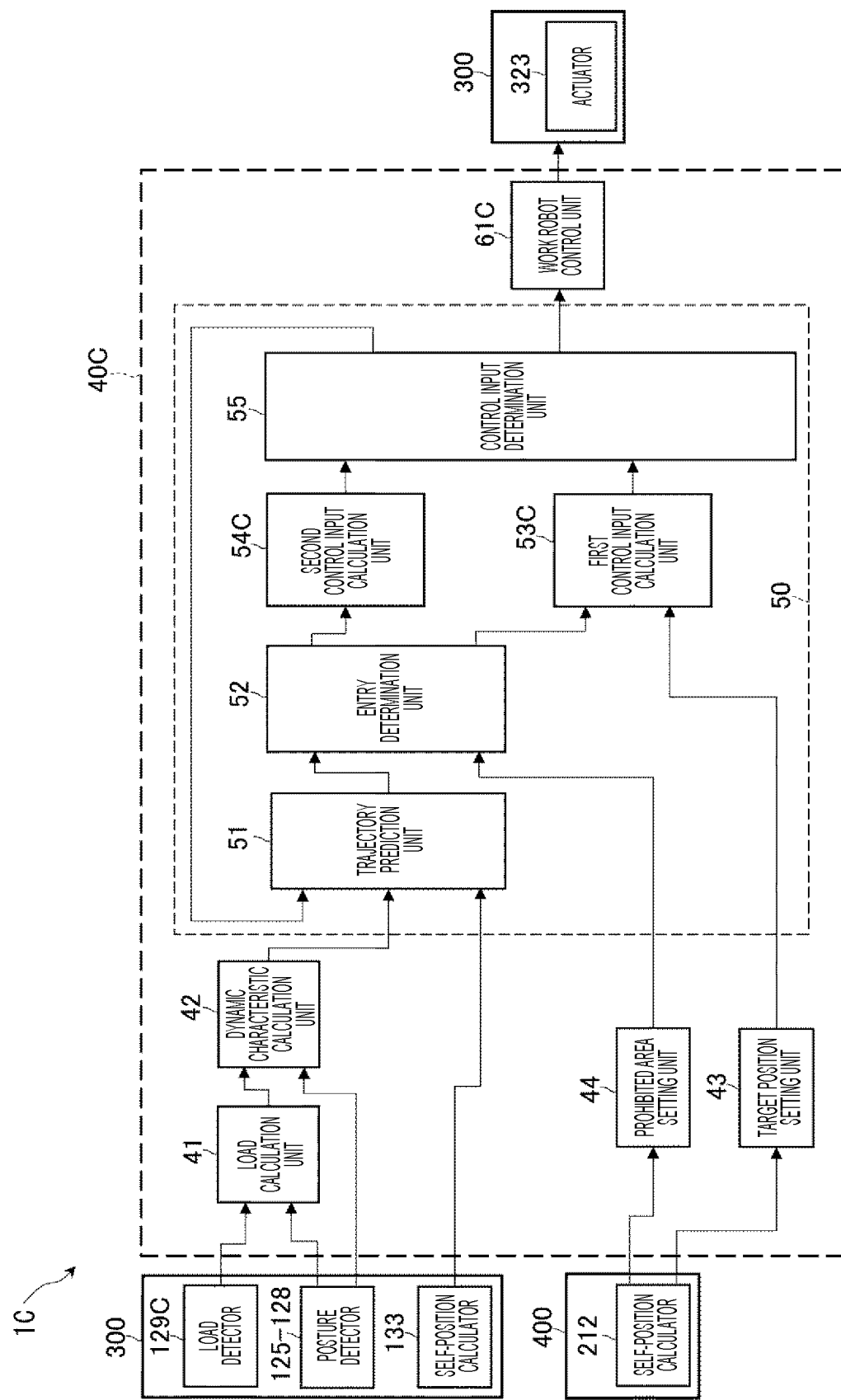
FIG. 17 is a block diagram illustrating a functional configuration of a third embodiment of the loading work support system of the present invention.

Next, a loading work support system according to a third embodiment of the present invention will be described with reference to FIG. 17. FIG. 17 is a block diagram illustrating a functional configuration of the third embodiment of the loading work support system of the present invention. Note that, in FIG. 17, components having the same reference numerals as those illustrated in FIGS. 1 to 16 are similar parts, and thus a detailed description thereof will be omitted.

The third embodiment of the loading work support system of the present invention is different from the first embodiment in that a work robot 300 is used as a loader instead of the excavator 100, and a transport robot 400 is used as a transporter instead of the dump truck 200 to support the loading work of the work robot 300 with respect to the transport robot 400.

The work robot 300 includes an articulated arm configured by rotatably connecting a plurality of link members. That is, as illustrated in FIG. 7, the articulated arm has a configuration similar to that of the front work device 101 of the excavator 100. However, the operation of the arm is performed by an actuator 323 such as an electric motor, for example, without a hydraulic actuator such as a hydraulic cylinder. Similarly to the dump truck 200, the transport robot includes a loading table. However, the operation (movement) of the transport robot 400 is not performed by the engine via the accelerator 207, but is performed by an actuator 407 (see FIG. 18 to be described later) such as an electric motor.

In a loading work support system 1C of the present embodiment, a sensor that detects the load of the actuator 323 is used as a load detector 129C that detects the load of the arm of the work robot 300 instead of the pressure sensor 129. In addition, instead of the excavator control unit 61 that controls the operation of the excavator 100, a work robot control unit 61C that controls the operation (actuator) of the work robot 300 is provided. In addition, a first control input calculation unit 53C and a second control input calculation unit 54C of the control input calculation unit 50 in the support system control unit 40C perform calculation using the distal end position of the arm instead of the pawl tip position of the bucket 108 of the excavator 100.

According to the third embodiment of the loading work support system of the present invention described above, even for the loading work of the work robot 300 and the transport robot 400, as in the case of the first embodiment described above, safe loading work can be realized without the distal end of the arm of the work robot 300 contacting the transport robot 400.

Modification of Third Embodiment

Figure 18:
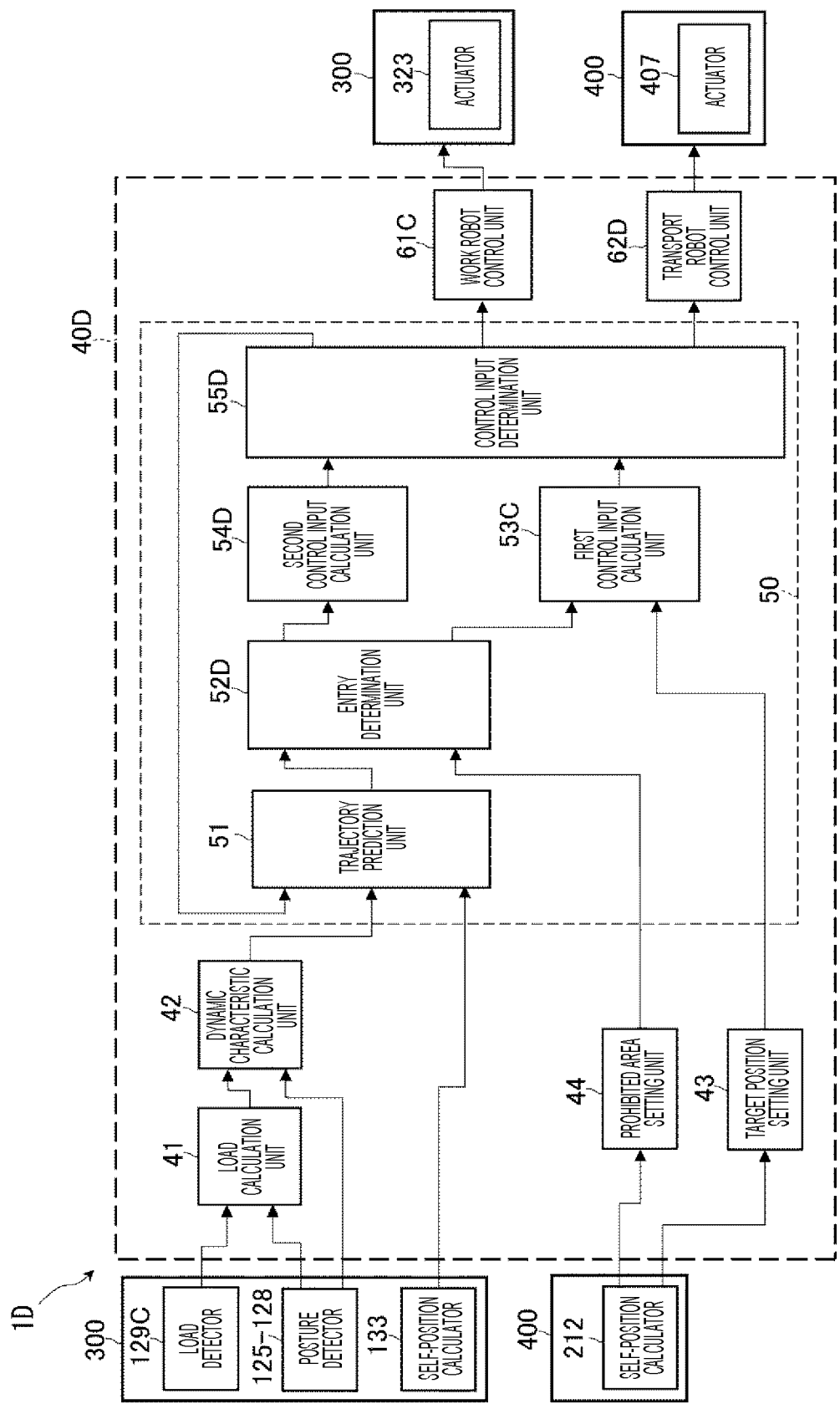
FIG. 18 is a block diagram illustrating a functional configuration of a modification of the third embodiment of the loading work support system of the present invention.

Next, a modification of the third embodiment of the loading work support system of the present invention will be described with reference to FIG. 18. FIG. 18 is a block diagram illustrating a functional configuration of a modification of the third embodiment of the loading work support system of the present invention. Note that, in FIG. 18, components having the same reference numerals as those illustrated in FIGS. 1 to 17 are similar parts, and thus a detailed description thereof will be omitted.

A loading work support system 1D according to the modification of the third embodiment of the present invention illustrated in FIG. 18 is different from the modification of the first embodiment in that the loading work support system 1D supports the loading work of the work robot 300 with respect to the transport robot 400 by using the work robot 300 as a loader instead of the excavator 100 and using the transport robot 400 as a transporter instead of the dump truck 200. In addition, while the third embodiment controls only the operation of the work robot 300 (loader) to avoid contact between the work robot 300 and the transport robot (transporter) 400 at the time of loading work, the modification of the third embodiment controls both the operations of the work robot 300 and the transport robot to avoid contact between them at the time of loading work.

The support system control unit 40D of the loading work support system 1D of the present modification includes a transport robot control unit 62D in addition to the functional units 41 to 44, 50, and 61C of the third embodiment. The transport robot control unit 62D controls the movement of the transport robot 400 by controlling the operation of the actuator 407 of the transport robot 400.

In the control input calculation unit 50 of the present modification, the calculation of the entry determination unit 52D, the second control input calculation unit 54D, and the control input determination unit 55D is different from the calculation of the functional units 52, 54C, and 55 of the third embodiment, and is changed to calculation in consideration of the control of the transport robot 400. The specific content is only to replace the dump truck 200 in the description of the modification of the first embodiment with the transport robot 400.

In the present modification, not only the operation of the work robot is controlled, but also the operation of the transport robot is controlled at the same time, so that the loading work and the transport work can be more safely executed as compared with the case of the third embodiment. That is, according to the modification of the third embodiment, even for the loading work of the work robot 300 and the transport robot 400, as in the case of the modification of the first embodiment described above, it is possible to more reliably realize the safe loading work without the distal end of the arm of the work robot 300 contacting the transport robot 400.

OTHER EMBODIMENTS

Note that the present invention is not limited to the present embodiment, and includes various modifications. The above-described embodiments have been described in detail for easy understanding of the present invention, and are not necessarily limited to those having all the described configurations. A part of the configuration of one embodiment can be replaced with the configuration of another embodiment, and the configuration of another embodiment can be added to the configuration of one embodiment. In addition, it is also possible to add, delete, and replace other configurations for a part of the configuration of each embodiment.

Figure 19:
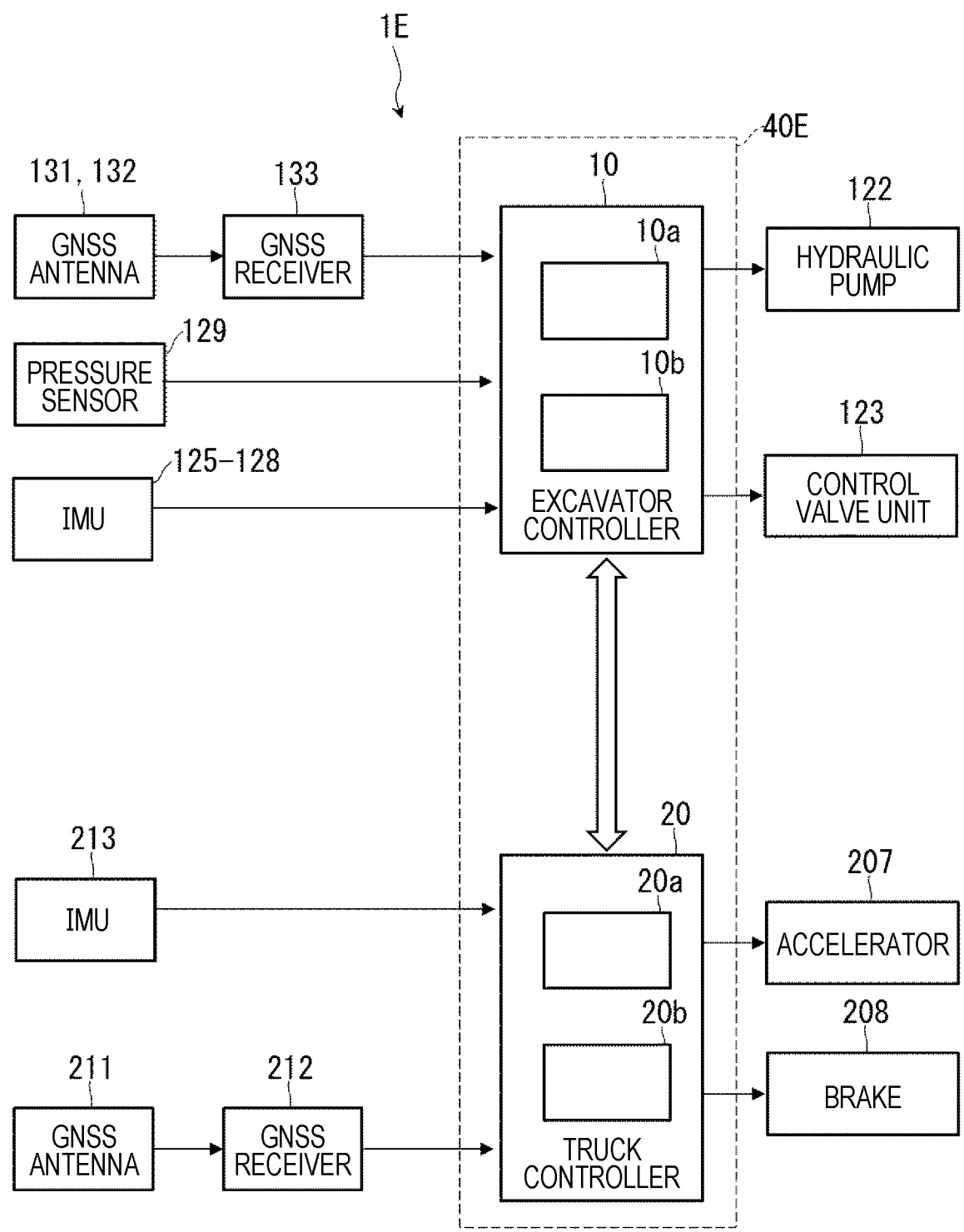
FIG. 19 is a block diagram illustrating a schematic configuration of another embodiment of the loading work support system of the present invention.

For example, in the present embodiment described above, the example of the configuration in which the loading work support systems 1, 1A, 1B, 1C, and 1D include the excavator controller 10, the truck controller 20, and the control controller 30 (see FIG. 5) has been described. However, in a case where there is one excavator 100 and one dump truck 200 at the work site, and the combination of the excavator and the dump truck is not changed, the configuration of a loading work support system 1E illustrated in FIG. 19 is possible. That is, a support system control unit 40E can be configured to omit the control controller 30 illustrated in FIG. 5 and perform loading work support by direct communication between the excavator controller 10 and the truck controller 20. FIG. 19 is a block diagram illustrating a schematic configuration of another embodiment of the loading work support system of the present invention. In this case, the function of the control controller 30 illustrated in FIG. 5 may be mounted on the excavator controller 10 or the truck controller 20.

In the present embodiment described above, the example of the configuration in which the loading work support systems 1, 1A, 1B, 1C, and 1D include the load calculation unit 41 has been described. However, the loading work support system can be configured to omit the functional unit of the load calculation unit 41. In this case, the calculation processing is reduced by omitting the functional unit of the load calculation unit 41, but since the dynamic characteristics of the work device does not consider the load of the cargo, the accuracy of the prediction calculation may decrease.

REFERENCE SIGNS LIST

10 Excavator-controller (control device)
20 Truck controller (control device)
30 Control controller (control device)
100 Excavator (loader)
101 Front work device (work device)
103 Upper swinging body (swinging body)
106 Boom (driven member)
107 Arm (driven member)
108 Bucket (driven member)
125 Vehicle body IMU (posture detector)
126 Boom IMU (posture detector)
127 Arm IMU (posture detector)
128 Bucket IMU (posture detector)
129 Pressure sensor (load detector)
133 GNSS receiver (first position calculator)
200 Dump truck (transporter)
202 Loading table
205 Cab
212 GNSS receiver (second position calculator)
300 Work robot (loader)
400 Transport robot (transporter)

The invention claimed is:

1. A loading work support system that supports a loading work of loading a cargo by a loader including an articulated work device configured by rotatably connecting a plurality of driven members onto a transporter including a loading table, the loading work support system comprising:
a first position calculator that calculates a position and an azimuth of the loader;
a posture detector that detects a posture of the work device;
a second position calculator that calculates a position and an azimuth of the transporter; and
a control device that controls an operation of the loader, the control device executing:
setting a target position, which is a position to be reached by the work device in the loading work, based on an output of the second position calculator;
setting a prohibited area, which is an area where entry of the work device is prohibited, based on an output of the second position calculator;
performing prediction calculation of predicting a trajectory of the work device in a finite prediction time section using an output of the first position calculator, an output of the posture detector, and dynamic characteristics of the work device;
determining whether or not the work device enters the prohibited area in the prediction time section based on a calculation result of trajectory prediction of the work device;
when it is determined that the work device does not enter the prohibited area, calculating a first input that is an input of the dynamic characteristics of the work device such that a distal end of the work device approaches the target position in the prediction time section based on the calculation result of trajectory prediction of the work device;
when it is determined that the work device enters the prohibited area, calculating a second input that is an input of the dynamic characteristics of the work device such that the distal end of the work device approaches a position different from the target position outside the prohibited area and closer to the target position than the position of the distal end of the work device in the prediction time section;
calculating a control input for controlling an operation of the loader based on one of the calculated first input and second input of the dynamic characteristics of the work device; and
controlling the loader based on the calculated control input,
wherein the control device changes the limit of the prediction time section to be changed to be longer as a relative approach speed of the transporter with respect to the loader calculated based on the output of the first position calculator and the output of the second position calculator increases.

2. The loading work support system according to claim 1, further comprising:
a load detector that detects a load of the work device, wherein
the control device further executes:
calculating a load of a cargo held by the work device based on the output of the load detector and the output of the posture detector; and
adjusting the dynamic characteristics of the work device based on the calculated load of the cargo and the output of the posture detector.

3. The loading work support system according to claim 1, wherein
the control device is configured to control an operation of the transporter in addition to an operation of the loader,
the control device further performs prediction calculation of predicting movement of the transporter in the prediction time section using dynamic characteristics of the transporter,
the control device determines whether or not the work device has entered the prohibited area in consideration of a calculation result of movement prediction of the transporter,
the calculation of the control device when it is determined that the work device enters the prohibited area is changed so as to calculate a second input of the dynamic characteristics of the work device and a second input of the dynamic characteristics of the transporter such that the distal end of the work device approaches a position different from the target position outside the prohibited area and closer to the target position than the position of the distal end of the work device in the prediction time section, and
the control device further calculates a control input for controlling an operation of the transporter based on the calculated second input of the dynamic characteristics of the transporter, and controls the transporter based on the calculated control input.

4. The loading work support system according to claim 1, wherein
the transporter is a dump truck including a cab in addition to the loading table,
the loader is an excavator including a front work device as the work device and a swingable swinging body provided with the front work device, and
the control device controls an operation of the front work device and a swing operation of the swinging body.

5. The loading work support system according to claim 3, wherein
the transporter is a dump truck including a cab in addition to the loading table, the loader is an excavator including a front work device as the work device and a swingable swinging body provided with the front work device, and the control device controls an operation of the front work device of the excavator and a swing operation of the swinging body, and controls movement of the dump truck.

6. The loading work support system according to claim 4, wherein the control device sets the prohibited area so as to surround a periphery of the dump truck and to allow a periphery of the cab to be wider than a periphery of the loading table.

7. The loading work support system according to claim 4, wherein in a case where the dump truck is moving, the control device sets the prohibited area to be wider than a case where the dump truck is stopped on a traveling direction side of the dump truck.

8. The loading work support system according to claim 4, wherein when the excavator performs a plurality of times of loading work until the dump truck transports the cargo, the control device sets the target position to a different position with respect to the loading table of the dump truck for each loading work of the excavator.

9. The loading work support system according to claim 1, wherein the control device is configured to execute a series of processing including calculation of trajectory prediction of the work device, determination of presence or absence of entry of the work device into the prohibited area, calculation of the first input of the dynamic characteristics of the work device, and calculation of the second input of the dynamic characteristics of the work device using an evaluation function of model predictive control.

10. The loading work support system according to claim 9, wherein the evaluation function includes a penalty function that increases a value of the evaluation function when the work device enters the prohibited area.

\* \* \* \* \*